(12) United States Patent
Park

(10) Patent No.: US 10,043,125 B2
(45) Date of Patent: Aug. 7, 2018

(54) SMART RING

(71) Applicant: QUALCOMM Incorporated, San Diego, CA (US)

(72) Inventor: Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 14/679,841

(22) Filed: Apr. 6, 2015

(65) Prior Publication Data

US 2016/0292563 A1 Oct. 6, 2016

(51) Int. Cl.
| | | |
|---|---|---|
| G06K 19/077 | (2006.01) | |
| G06K 19/07 | (2006.01) | |
| G06F 3/01 | (2006.01) | |
| G06F 3/0488 | (2013.01) | |
| G06F 3/0354 | (2013.01) | |
| H04M 1/725 | (2006.01) | |

(52) U.S. Cl.
CPC ....... G06K 19/07762 (2013.01); G06F 3/014 (2013.01); G06F 3/016 (2013.01); G06F 3/03547 (2013.01); G06F 3/04883 (2013.01); G06K 19/0723 (2013.01); G06K 19/07701 (2013.01); H04M 1/7253 (2013.01); G06F 2203/04808 (2013.01)

(58) Field of Classification Search
CPC .......... G06F 2203/04808; G06F 3/014; G06F 3/016; G06F 3/03547; G06F 3/04883; G06F 1/163; G06K 19/0723; G06K 19/07701; G06K 19/07762; H04M 1/7253
See application file for complete search history.

(56) References Cited

U.S. PATENT DOCUMENTS

| | | | | |
|---|---|---|---|---|
| 2009/0303005 | A1* | 12/2009 | Tuttle | H04Q 9/00 340/10.1 |
| 2011/0022196 | A1* | 1/2011 | Linsky | G06F 1/163 700/85 |
| 2011/0210931 | A1* | 9/2011 | Shai | G06F 3/014 345/173 |
| 2012/0075196 | A1 | 3/2012 | Ashbrook et al. | |
| 2012/0321150 | A1 | 12/2012 | Ranganathan et al. | |
| 2013/0120245 | A1 | 5/2013 | Welland | |
| 2013/0154919 | A1* | 6/2013 | Tan | G01S 15/50 345/156 |
| 2015/0241976 | A1* | 8/2015 | Zhao | G06F 3/017 345/158 |
| 2015/0277559 | A1* | 10/2015 | Vescovi | G06F 3/014 345/173 |
| 2015/0287412 | A1* | 10/2015 | Tang | A44C 9/0053 704/275 |
| 2016/0034742 | A1* | 2/2016 | Kim | H04B 1/385 382/124 |

\* cited by examiner

*Primary Examiner* — Mohamed Barakat
(74) *Attorney, Agent, or Firm* — Paradice and Li LLP

(57) ABSTRACT

Systems and methods are described herein for pairing at least one smart ring with a primary device. The primary device receives one or more identification signals having information relating to an identity of one or more smart rings. Each identification signal received from an associated one of the one or more smart rings based on motion of the associated one of the one or more smart rings with respect to the primary device. The processor of the primary device identifies the one or more smart rings based on the one or more identification signal.

27 Claims, 26 Drawing Sheets

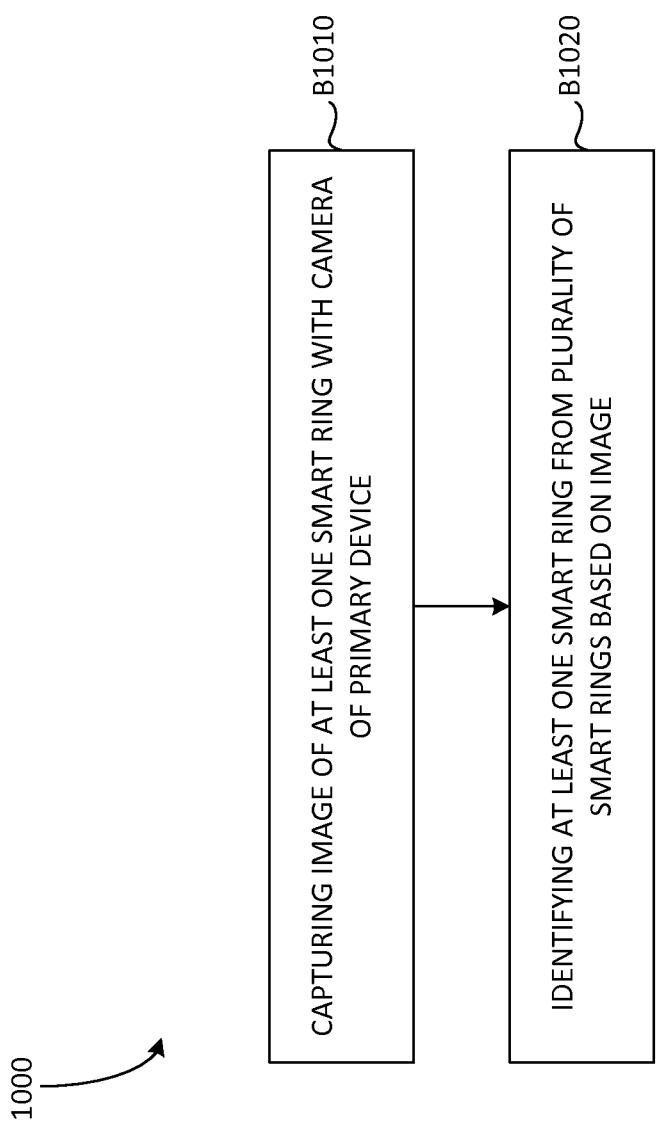

SMART RING

BACKGROUND

1. Field

Embodiments described herein generally relate to smart electronic wearable devices, and more specifically, to smart electronic rings.

2. Background

Wearable electronic devices include smart watches, smart glasses, and the like. Such devices may be paired with a primary device (e.g., smart phones, processor computers, or other network connectable electronic devices), for communication with the primary device, or with other network devices through the primary device. Shortcomings of current wearable electronic devices include: requiring two hands to operate, short battery life due to rich display, limited input, limited output, substantial sizes, and the like.

For example, a smart watch may be a wearable electronic device configured to be worn on a wrist of a user. When the smart watch is worn on the wrist of one hand, a second hand is required to interact with a user interface of the smart watch, for user input. Accordingly, it can be inconvenient for a user to interact with the smart watch when the second hand is preoccupied. In addition, some smart watches and other wearable electronic devices tend to include rich display capabilities, such as relatively large or complex display screens, leading to shorter battery life.

Furthermore, some wearable electronic devices are provided with a limited input area or other limited input capabilities, thus limiting the number of operations or motions the user could perform for input. For example, the user may be limited to using fingers of one hand (the second hand) to interact with the smart watch worn on the wrist of the user's first hand. Accordingly, existing wearable electronic devices can have limited flexibility in allowing different input methods or gestures.

Moreover, wearable electronic devices generally have larger sizes than their counterpart conventional non-smart devices. For instance, the smart watch may be larger than a traditional watch.

SUMMARY

An electronic device is configured as a smart ring to be worn on a finger of a user, and is coupled to a primary device to relay data to or from the primary device. The above electronic ring device is configured to detect an input of the user, based on at least one of an particular area on the smart ring touched by the user, a material used by the user to contact or touch the smart ring, and motion, including touch motions or gestures. The above electronic smart ring device has an output device or interface for outputting information to the user, the output device including a display screen, light source, audio output device, electro-magnetic device, and/or vibration generator in the body of the smart ring.

A further embodiment includes a set of multiple electronic smart ring devices as described above, where each electronic smart ring device is associated automatically or manually with a particular finger by receiving user input on the primary device relating to finger association. Alternatively, the association process may be implemented based on sequence of signals (light or sound) generated from the electronic smart ring devices or the primary device. The light may be reflected light, visible light, infrared light, a combination thereof, and/or the like. In other embodiments, the association process may be implemented based on photograph or videos of the electronic smart ring devices. In some embodiments, In particular embodiments, the electronic smart ring device has an annular ring part and a separable part, where the separable part may include electronics and a rechargeable power source.

For example, in various embodiments, a method includes receiving, by a primary device, one or more identification signals having information relating to an identity of one or more smart rings. Each identification signal received from an associated one of the one or more smart rings based on motion of the associated one of the one or more smart rings with respect to the primary device. The processor of the primary device identifies the one or more smart rings based on the one or more identification signals.

In some embodiments, the one or more identification signals are at least one of light emitted by the one or more smart rings or light reflected by the one or more smart rings.

In various embodiments, the one or more identification signal include a sound signal having a frequency. The sound signal is generated by a sound-generating device of the smart ring. Identifying the one or more smart rings based on the one or more identification signals includes identifying a Doppler shift of the frequency of the sound signal based on the motion of the associated one of the one or more smart rings with respect to the primary device.

In some embodiments, the method further includes storing a plurality of stored identification signals associated with each of a plurality of the smart rings. Identifying the smart ring includes identifying the one or more smart rings from the plurality of smart rings by comparing the one or more identification signals with the plurality of stored identification signals.

In some embodiments, receiving the one or more identification signals includes receiving a first identification signal related to a first one of the one or more smart rings and receiving a second identification signal related to a second one of the one or more smart rings.

According to some embodiments, the first identification signal is a first sound signal having a first frequency. The first sound signal is generated by the first smart ring while the first smart ring is in motion with respect to the primary device. The second identification signal is a second sound signal having a second frequency. The second sound signal is generated by the second smart ring while the second smart ring is in motion with respect to the primary device. The first frequency and the second frequency are different.

In further embodiments, identifying the one or more smart rings based on the one or more identification signals includes: identifying a first Doppler shift with respect to the first frequency and identifying a second Doppler shift with respect to the second frequency.

In some embodiments, the first Doppler shift and the second Doppler shift are captured by a microphone of the primary device as the first smart ring and the second smart ring are moving with respect to the primary device.

In further embodiments, receiving the one or more identification signals includes receiving the one or more identification signals as the first and second smart rings are moved in a predefined first direction.

In some embodiments, identifying the one or more smart rings includes identifying a relative position between the first smart ring and the second smart ring as the first smart ring and the second smart are moved with respect to the primary device in a predefined first direction.

In some embodiments, identifying the one or more smart rings includes identifying a first finger on which the first smart ring is worn and identifying a second finger on which the second smart ring is worn.

In various embodiments, identifying the one or more smart rings includes determining a sequential order in which the first smart ring and the second smart ring pass a predefined area on the primary device.

According to various embodiments, identifying the one or more smart rings includes identifying the first smart ring and the second smart ring from a plurality of three or more smart rings.

In some embodiments, identifying the one or more smart rings includes identifying a spatial relationship between the first smart ring and the second smart ring.

According to some embodiments, a method is described. The method includes receiving, by a smart ring, one or more identification signals related to identity of the smart ring. The one or more identification signals are sent by a primary device based on motion of the smart ring with respect to the primary device. The processor of the primary device or a processor of the smart ring identifies the smart ring based on the one or more identification signals.

In some embodiments, the one or more identification signals include at least one of a sound signal or a reflected light signal.

In various embodiments, the one or more identification signal include a sound signal having a frequency. The sound signal is generated by a speaker of the primary device. Identifying the smart ring based on the identification signal includes identifying a Doppler shift of the frequency of the sound while the smart ring is in motion with respect to the primary device.

In further embodiments, the method includes storing a plurality of stored identification signals associated with each of a plurality of the smart rings. Identifying the smart ring includes identifying the smart ring from the plurality of smart rings by comparing the one or more identification signals with the plurality of stored identification signals.

According to some embodiments, the one or more identification signals is based on light. The method further includes emitting light, by the smart ring, light to the primary device, capturing reflected light reflected by the primary device, and identifying the one or more smart rings based on the reflected light associated with the smart ring.

In some embodiments, a system is described to include a smart ring and a primary device. The primary device includes an interface configured to receive one or more identification signals related to an identity of the one or more smart rings. Each identification signal received from an associated one of the one or more smart rings based on motion of the associated one of the one or more smart rings with respect to the primary device. The primary device also includes a processor configured to identify the one or more smart rings based on the one or more identification signals.

According to some embodiments, the one or more identification signal includes a sound signal having a frequency. The sound signal is generated by a speaker of the one or more smart rings. The processor identifies the one or more smart rings by identifying a Doppler shift of the frequency of the sound signal based on the motion of the associated one of the one or more smart rings with respect to the primary device.

In some embodiments, the processor is configured to store a plurality of stored identification signals associated with each of a plurality of the smart rings. The processor identifies the one or more smart rings by comparing the one or more identification signals with the plurality of stored identification signals.

In various embodiments, the interface is configured to receive the one or more identification signals by receiving a first identification signal related to a first one of the one or more smart rings. Receiving a second identification signal related to a second one of the one or more smart rings.

In some embodiments, the first identification signal is a first sound signal having a first frequency. The first sound signal is generated by the first smart ring while the first smart ring is in motion with respect to the primary device. The second identification signal is a second sound signal having a second frequency. The second sound signal is generated by the second smart ring while the second smart ring is in motion with respect to the primary device. The first frequency and the second frequency are different.

In various embodiments, the processor identifies the smart ring by identifying a first Doppler shift with respect to the first frequency and identifying a second Doppler shift with respect to the second frequency.

According to some embodiments, the interface receives the one or more identification signals by receiving the one or more identification signals as the first and second smart rings are moved in a predefined first direction.

In some embodiments, the processor identifies the smart ring by identifying a relative position between the first smart ring and the second smart ring as the first smart ring and the second smart are moved with respect to the primary device in a predefined first direction.

According to various embodiments, the processor identifies the smart ring by identifying a first finger on which the first smart ring is worn and identifying a second finger on which the second smart ring is worn.

In some embodiments, the processor identifies the smart ring by determining a sequential order in which the first smart ring and the second smart ring pass a predefined area on the primary device.

In various embodiments, a system includes means for receiving one or more identification signals having information relating to an identity of one or more smart rings. Each identification signal received from an associated one of the one or more smart rings based on motion of the associated one of the one or more smart rings with respect to the primary device. The system also includes means for identifying the smart ring based on the identification signal.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

FIG. 10 is an image-based identification process according to various embodiments.

DETAILED DESCRIPTION

Figure 1:
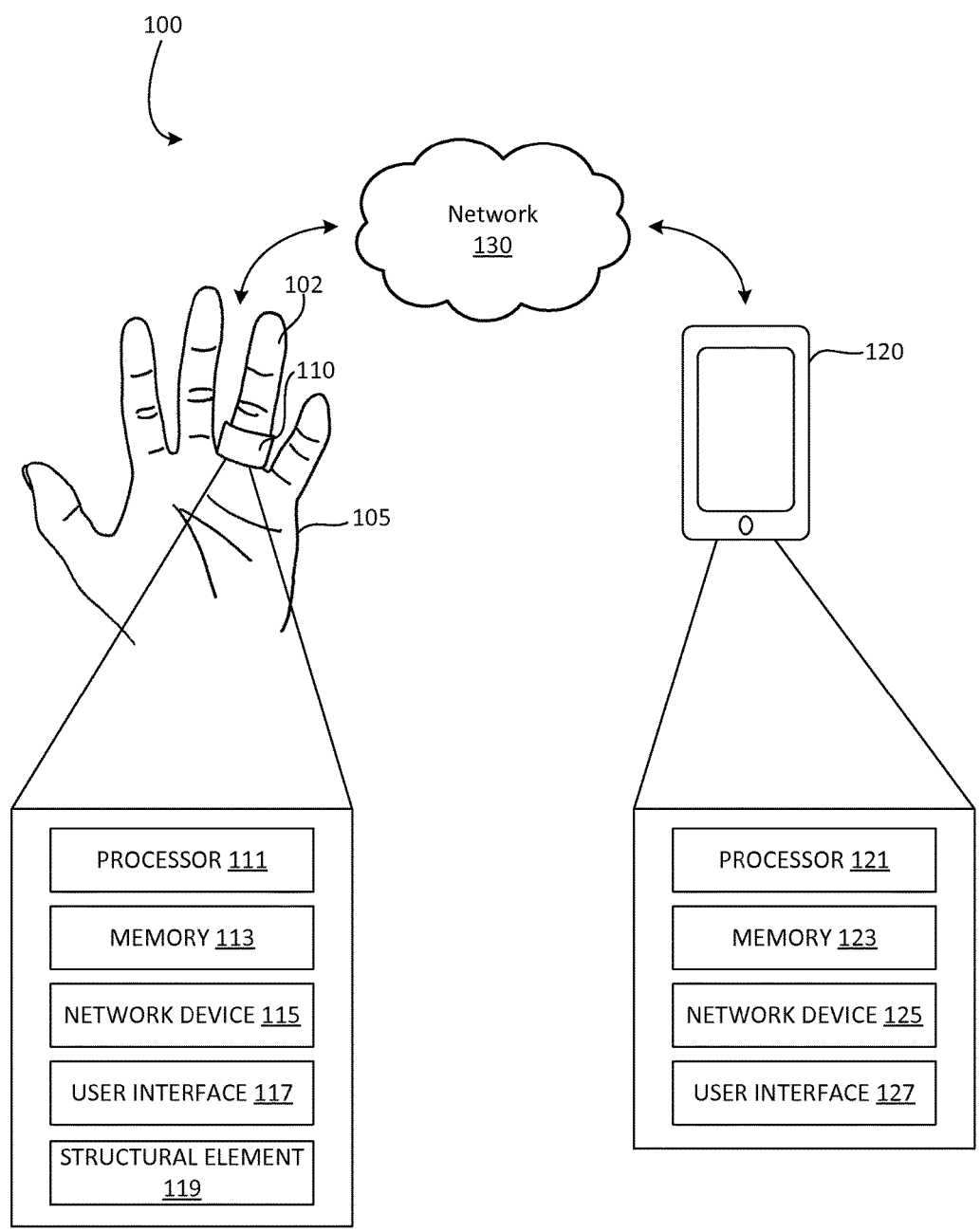
FIG. 1 is a schematic diagram of a system in accordance with various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Embodiments relate to a wearable electronic "smart ring" (or a set of smart rings) to be worn on a user's finger(s). A smart ring may be coupled (wireless or wired) to a primary device such as a smart phone. The smart ring may include at least one user input device (e.g., touch surfaces, buttons, etc.) on an outer surface of the body of the ring, for receiving user input. The smart ring may include an output device such as a display screen, one or more light sources (LEDs), a tactile device, or the like to output information to a user. The smart ring may include a processor and memory for performing functions described herein. The smart ring may include a network device for wired or wireless data communication.

When the smart ring is worn on a user's finger, various components (e.g., touch areas) of the user input device (e.g., a touch surface) are arranged in positions to be touched by other fingers of a same or different hand. Depending on the touch area touched, particular input commands are detected. In addition, a same touch area may be configured to distinguish between different materials (e.g., skin, nail, another ring on another finger, article of clothing, and the like). Articles of clothing may include, but not limited to, rivets on jeans, buttons, belt loops, a combination thereof, and/or the like. Additional material such as glasses (e.g., frames of glasses), belt, hair, and/or the like may also be the different materials. Thus, when the user touches a touch area with different parts of the body (e.g., skin, flesh, finger nail, or another ring), different inputs may be detected by the smart ring. Additionally, different touch motions (e.g., multiple taps, rubbing, sliding, holding, multi-finger motions, transition from one to another thereof or combinations thereof) may be detected by the smart ring as different user inputs. Thus, a user may input different information, by touching different areas of the smart ring and/or by touching such areas with different materials (skin, finger nail, or another ring), and/or with different types of touching (tapping, rubbing, holding, etc.). Accordingly, the user performs "gestures" for inputting information into the smart ring. The user input device of the smart ring may include a microphone for capturing sound or other sensors for detecting light, sound, or other environmental conditions.

In some embodiments, multiple smart rings may be worn on a same finger, different segments of a same finger, different fingers of a same hand, different fingers of different hands, or a combination thereof. The use of two or more smart rings may allow further detectable user inputs, such as touching two or more of the smart rings in a predefined combination, sequence, or speed/rate (e.g., by contacting, clasping, swiping, or interlacing fingers together in predefined manners).

The outer surface of a body of the smart ring may include a visual output device, such as one or more lights (e.g., LEDs) or a screen display for displaying visual outputs such as texts, graphics, and the like. The color of the light, the sequence in which one or more lights turns on/off, and/or the like may correspond to predefined output messages. The output device may include one or more speakers, other audio output devices, vibration, and/or other tactile indicators. For example, different volumes and types of sound, different strengths, sequences, or directions of vibration, or combinations thereof, may represent different messages. A magnetic device in one or more smart rings may be used to selectively generate magnetic attraction and repulsion between two adjacent rings, to represent messages to the user.

Multiple smart rings may be stored in a case when not used. The case may include a charger capable of charging the smart rings. The battery status of each ring may be displayed on the primary device and/or the smart ring output device. Alternatively or in addition to a battery, each ring may include a chargeable capacitor or other inductively chargeable device. A smart ring may include two separable parts, a first part including at least a battery and a second part including an annular body that fits on a finger. The two parts may be selectively separated, and the first part may be charged by the charging devices. In other embodiments, the first part may include at least some electronics (e.g., at least one of the processor, memory, user output device, and/or network device). The second part may include at least one output device and/or at least one input device (e.g., at least one of the light pipes, conductive pipes, LCD, LED, and/or the like). The second part may be selected or configured for the user's finger size, while the first part may be configured to selectively attach to any of multiple first parts (to be interchangeable).

A set of smart rings may include multiple smart rings, each of which is associated with a particular finger (e.g. on one hand). The association may be predetermined such that each smart ring is pre-designated for a particular finger. In other embodiments, the association may be determined after the smart rings are placed on the user's fingers. The association processes may be manual (e.g., via user input) or automatic. For example, after placing the set of rings on the fingers of a hand, a camera of the primary device may take a picture of the hand, and may automatically associate a particular ring with a finger based on characteristics (e.g., color of at least a portion of the ring). Alternatively, each smart ring may be associated with a particular detectable output (detectable radio frequency (RF) signal, optical signal, audio pitch, or the like). When the user passes the hand in a particular direction near a microphone or other sensor on the primary device, the primary device may capture the pitch frequency or other detectable signals from the rings and automatically associate each smart ring with a particular finger, based on the sequence of detected signals. Alternatively, the user may tap fingers on or near a sensor on the primary device (e.g., from pinky to index finger or other predefined sequence) to allow detection of the detectable output of each ring, in sequence.

With reference to FIG. 1, a schematic diagram of a system 100 is shown in accordance with various embodiments. The system 100 may include at least a smart ring 110 and a primary device 120. The smart ring 110 and the primary device 120 may be connected via a network 130. The smart ring 110 may be worn on a finger 102 of a hand 105 of a user. The primary device 120 may be a device of the user or another person. In other embodiments, the primary device 120 may be a device such as, but not limited to, the smart ring 110. In other words, the primary device 120 may be another smart ring 110 or another smart wearable. The smart ring 110 and the primary device 120 may be coupled such that, the smart ring 110 may perform at least one of: relaying input data from the user to the primary device 120, outputting data to the user, and the like, in the manner described.

In some embodiments, the primary device 120 may be provided with a processor (e.g., a processor 121) and/or a memory (e.g., a memory 123) having greater capacity (processing power and/or storage capacity) as compared to those of the smart ring 110. Therefore, the bulk of data processing and/or data storage may take place at the primary device 120. The primary device 120 may be The smart ring 110 may serve as an external user interface with the user for relaying user input and outputting data. In other embodiments, the smart ring 110 may not be connected to the primary device 120 via the network 130. The smart ring 110 may perform processes independent to any mobile devices such as the primary device 120. In other words, the smart ring 110 may locally process user input and generate output data internally.

The smart ring 110 may include at least one a processor 111, memory 113, network device 115, user interface 117, and structural element 119. The structural element 119 may be any structural support for the smart ring 110. In some embodiments, the smart ring 110 may be a finger-worn ring containing electronic components for performing functions described herein. In other embodiments, the smart ring 110 may be any other wearable devices such as, but not limited to, gloves, palm sleeves, other articles of clothing, tattoo, a combination thereof, and/or the like. In other words, the embodiments described herein relating to the smart ring 110 may be extended to devices covering at least a portion of palms, edges of hands, length of finger, multiple segments of a finger, multiple fingers, and/or the like without deviation from the spirit of the embodiments.

For example, the structural element 119 may be a ring-shaped element composed of any suitable material that is at least substantially rigid, allowing the user to wear the smart ring 110 on the finger 102 of the hand 105. The structural element 119 may include cavities for receiving components or modules of the smart ring 110, such as, but not limited to, the processor 111, memory 113, network device 115, user interface 117, and the like.

Alternatively or additionally, the smart ring 110 may include at least one coupler, fastener, connector of various suitable types for securing components or modules of the smart ring 110 to the structural element 119. Such coupler, fastener, or connector may be, as a non-limiting example, a clip, gluing, welding, screw, magnet, and/or other types of mechanical and/or electromagnetic affixations. In some embodiments, the coupler, fastener, or connector may be configured to affix or join at least a portion of a component of the smart ring 110 to an external surface of the smart ring 110 (e.g., an external surface of the structural element 119). In other embodiments, the coupler, fastener, or connector may be configured to affix or join an entire component of the smart ring 110 within the external volume defined by the structural element 119, such that no portions of the element may be exposed from any external surfaces defined by the structural element 119.

The processor 111 may include any suitable data processing device, such as a general-purpose processor (e.g., a microprocessor), but in the alternative, the processor 111 may be any suitable electronic processor, controller, microcontroller, or state machine. The processor 111 may also be implemented as a combination of computing devices (e.g., a combination of a DSP and a microprocessor, a plurality of microprocessors, at least one microprocessors in conjunction with a DSP core, or any other such configuration).

The memory 113 may be operatively coupled to the processor 111 and may include any suitable internal or external device for storing software and data for controlling and use by the processor 111 to perform operations and functions described herein, including, but not limited to, random access memory RAM, read only memory ROM, floppy disks, hard disks, dongles or other USB connected memory devices, or the like. The memory 113 may store an operating system (OS), as well as user application software and executable instructions. The memory 113 may also store application data, such as an array data structure.

The network device 115 may be configured for communication over the network 130. The network device 115 may include interface software, hardware, or combinations thereof, for communication over the network 130. The network device 115 may include hardware such as network modems, wireless receiver or transceiver electronics, and/or software that provide wired or wireless communication link with the network 130 (or with a network-connected device). In particular embodiments, the network device 115 may be coupled to the processor 111 for providing communication functions. The network device 115 may provide telephone and other communications in accordance with typical industry standards (the network 130 may be a network), such as, but not limited to code division multiple access (CDMA), time division multiple access (TDMA), frequency division multiple access (FDMA), long term evolution (LTE), wireless fidelity (WiFi), frequency modulation (FM), Bluetooth (BT), near field communication (NFC), Zigbee, 802.15.4, and the like. In particular embodiments, the network device 115 may be configured for (the network 130 may be) Bluetooth low energy (BTLE) or Zigbee, for communicating with the primary device 120 via the network 130.

The user interface 117 may include a user output device and a user input device. In some embodiments, the user output device may include any suitable device that provides a human-perceptible visible signal, audible signal, tactile signal, or any combination thereof, including, but not limited to a touchscreen, LCD, LED, CRT, light pipe, mirasol, plasma, or other suitable display screen, audio speaker or other audio generating device, combinations thereof, and the like. In one non-limiting example, the user output device of the user interface 117 may include a plurality of LEDs, each may be emit light of a same or different color. The sequence in which the LED emits light as well as the color of the LED may indicate different notifications or messages to the user, as described in more detail herein. In another non-limiting example, the user output device of the user interface 117 may include a visual display device (e.g., a curved mirasol) across an external circumferential surface of the smart ring 110. In yet another non-limiting example, the user output device of the user interface 117 of each of two smart rings 110 may include a magnetic device (e.g., coils or the like) for notifying a user using magnetic attraction or repulsion, as described herein.

In particular embodiments, the user interface 117 (as well as the user interface 127) may be configured to generate reflected light, visible light, infrared light, a combination thereof, and/or the like for association and identification processes described herein. The user interface 117 (as well as the user interface 127) may also generate sound for association and identification processes described herein.

In various embodiments, the user input device may include any suitable device that receives input from the use, the user input device including, but not limited to one or more manual operator (such as, but not limited to a switch, button, touchscreen, knob, slider or the like), microphone, camera, image sensor, accelerometer, and the like. In various embodiments, the user input device may include a tactile display device for receiving and identifying different input based on the user's contact with the tactile display device.

For example, the user input device may be detect user input based on contact between the user input device and a finger, thumb, fingernail/flesh thereof, tattooed identification, rivets on jeans, buttons, belt loops, glasses (e.g., frames of glasses), hair, or other suitable material (e.g., additional article of clothing, other parts of the body, magnetic properties, and/or the like). In addition, separate touch motion from even a same object may be distinguished and associated with separate user inputs. For example, the separate user input may be detected for compression, touching, holding, tapping, rubbing, scratching, double-scratching, sliding, turning, tilting, shifting, combination thereof, transitions thereof, or the like.

In addition, directionality, speed, and frequency of the touch motion may also be basis for separate user inputs, as described herein. The user input device may include touch areas, where each touch area, when interacted with, may detect a different user input. For user friendliness and power-consumption purposes, 2-3 touch areas may be provided to the user input device, in some embodiments. In other embodiments, 4 or more touch areas may be provided to the user input device.

The network 130 may allow data transfer between the smart ring 110 and the primary device 120. The data transferred may include content data as well as control data for controlling the smart ring 110. The network 130 may be a wide area communication network, such as, but not limited to, the Internet, or one or more Intranets, local area networks (LANs), ethernet networks, metropolitan area networks (MANs), a wide area network (WAN), combinations thereof, and/or the like. The network may be a network supported by at least one of radio access technologies such as, but not limited to, CDMA, TDMA, FDMA, LTE, WiFi, FM, BT, NFC, and the like. In particular embodiments, the network 130 may be a BTLE network.

In particular embodiments, the network 130 may represent one or more secure networks configured with suitable security features, such as, but not limited to firewalls, encryption, or other software or hardware configurations that inhibits access to network communications by unauthorized personnel or entities. The data transmittable over the network 130 may be encrypted and decrypted by the smart ring 110 and the primary device 120 using per frame keys, further securing the data.

The primary device 120 may include at least one a processor 121, memory 123, network device 125, and user interface 127. The primary device 120 may be any mobile or stationary computing systems performing any processing tasks involving receiving user input, outputting data or notification, identifying/pairing with the smart ring 110, a combination thereof, and/or the like. The primary device 120 may be any wired or wireless computing system or device having suitable processing and storage capabilities as described.

In some embodiments, the primary device 120 may be a desktop computer, mainframe computer, laptop computer, pad device, or the like, configured with hardware and software to perform operations described herein. For example, the primary device 120 may include typical desktop PC or Apple™ computer devices, having suitable processing capabilities, memory, user interface (e.g., display and input) capabilities, and communication capabilities, when configured with suitable application software (or other software) to perform operations described herein.

In some embodiments, the primary device 120 may include a mobile smart phone (such as, but not limited to an iPhone™, an Android™ phone, or the like) or other mobile phone with suitable processing capabilities. Typical modern mobile phone devices include telephone communication electronics as well as some processor electronics, one or more display devices and a keypad and/or other user input device, such as, but not limited to described above. Particular embodiments employ mobile phones, commonly referred to as smart phones, that have relatively advanced processing, input and display capabilities in addition to telephone communication capabilities.

However, the primary device 120, in further embodiments, may include any suitable type of mobile phone and/or other type of portable electronic communication device, such as, but not limited to, an electronic smart pad device (such as, but not limited to an iPad™), a portable laptop computer, or the like.

The processor 121 may include any suitable data processing device, such as a general-purpose processor (e.g., a microprocessor), but in the alternative, the processor 121 may be any suitable electronic processor, controller, microcontroller, or state machine. The processor 121 may also be implemented as a combination of computing devices (e.g., a combination of a DSP and a microprocessor, a plurality of microprocessors, at least one microprocessors in conjunction with a DSP core, or any other such configuration).

The memory 123 may be operatively coupled to the processor 121 and may include any suitable internal or external device for storing software and data for controlling and use by the processor 121 to perform operations and functions described herein, including, but not limited to, random access memory RAM, read only memory ROM, floppy disks, hard disks, dongles or other USB connected memory devices, or the like. The memory 123 may store an operating system (OS), as well as user application software and executable instructions. The memory 123 may also store application data, such as an array data structure.

The network device 125 may be configured for communication over the network 130. The network device 125 may include interface software, hardware, or combinations thereof, for communication over the network 130. The network device 125 may include hardware such as network modems, wireless receiver or transceiver electronics, and/or software that provide wired or wireless communication link with the network 130 (or with a network-connected device). In particular embodiments, the network device 125 may be coupled to the processor 121 for providing communication functions.

The network device 125 may provide telephone and other communications in accordance with typical industry standards, such as, but not limited to CDMA, TDMA, FDMA, LTE, WiFi, FM, BT, NFC, Zigbee, 802.15.4, and the like. In particular embodiments, the network device 125 may be configured for BTLE and ZigBee standards, for communicating with the smart ring 110 via the network 130.

In various embodiments, the network device 125 may include a device for communication with both the smart ring 110 and another radio device (for ordinary device operations of the primary device 120) over the same network 130 (where the network 130 may be a WiFi network). In other embodiments, the network device 125 may include two or more devices, with one device in communication with the smart ring 110 via the network 130 (e.g., BLTE) and another device in communication with another radio device via a separate network (not shown) for ordinary device operations of the primary device 120.

The user interface 127 may include a user output device and a user input device. In some embodiments, the user output device may include any suitable device that provides a human-perceptible visible signal, audible signal, tactile signal, or any combination thereof, including, but not limited to a touchscreen, LCD, LED, CRT, light pipe, mirasol, plasma, or other suitable display screen, audio speaker or other audio generating device, combinations thereof, and the like.

In various embodiments, the user input device may include any suitable device that receives input from the use, the user input device including, but not limited to one or more manual operator (such as, but not limited to a switch, button, touchscreen, knob, slider or the like), microphone, camera, image sensor, and the like. For example, the user input device may include a tactile display device for receiving and identifying different input based on the user's contact with the tactile display device, in the manner described.

While FIGS. shown herein may illustrate the smart ring 110 being worn on a particular finger (e.g., the finger 102 of hand 105), one of ordinary skill in the art would appreciate that the smart ring 110 can be worn on any finger or thumb (or any segment thereof) of any hand of the user based on ring association/pairing (the smart ring 110 may be worn on a particular finger to be operational or be able to accept useful input from other fingers/objects) or user preference (the smart ring 110 may adapt to the finger that wears the smart ring currently and may accept useful input after an association process as described). In addition, multi-ring systems in which two or more smart rings (e.g., the smart ring 110) may be described in further detail.

Figure 2A:
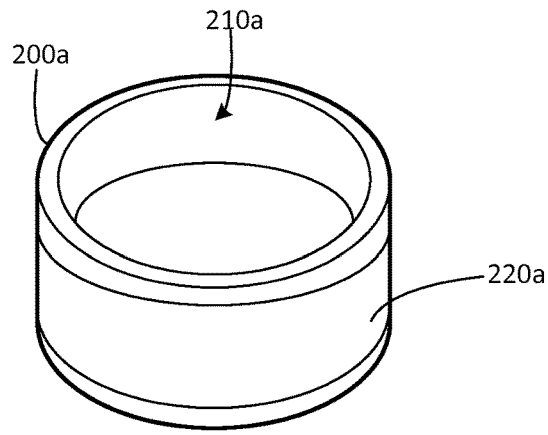
FIG. 2A is a perspective view of a smart ring according to a first embodiment.

FIG. 2A is a perspective view of a smart ring according to a first embodiment. Referring to FIGS. 1-2A, a first smart ring 200a may be a wearable ring such as, but not limited to, the smart ring 110. The structural element 119 of the first smart ring 200a shapes the first smart ring 200a to be an annular ring device having a first cavity 210a for receiving a finger (e.g., the finger 102) or thumb.

The first smart ring 200a may include a first touch surface 220a provided on the external circumferential surface of the first smart ring 200a. The first touch surface 220a may include the user input device of the user interface 117. For example, the first touch surface 220 may detect user input in the manner described. Furthermore, the first touch surface 220a may additionally include the user output device of the user interface 117. As such, the first touch surface 220a may be a touch screen display including both the user input device and the user output device of the user interface 117.

In some embodiments, the first touch surface 220a may occupy all or substantially all of the external circumferential surface of the first smart ring 220a, as supported by the structural element 119. In other embodiments, the first touch surface 220a may occupy a portion (e.g., approximately 30%, 40%, 50%, or the like) of the external circumferential surface of the first smart ring 220a, as supported by the structural element 119.

Figure 2B:
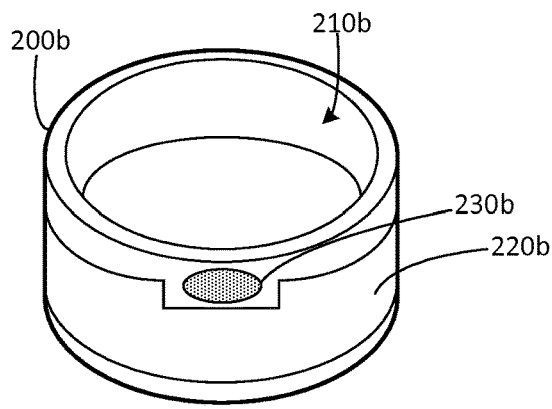
FIG. 2B is a perspective view of a smart ring according to a second embodiment.

FIG. 2B is a perspective view of a smart ring according to a second embodiment. Referring to FIGS. 1-2B, a second smart ring 200b may be a wearable ring such as, but not limited to, the smart ring 110. The structural element 119 of the second smart ring 200b shapes the second smart ring 200b to be an annular ring device having a second cavity 210b for receiving a finger (e.g., the finger 102) or thumb.

The second smart ring 200b may include a second touch surface 220b provided on the external circumferential surface of the second smart ring 200b. The second touch surface 220b may include the user input device and/or the user output device of the user interface 117. For example, the second touch surface 220b may be a touch (display) surface such as the first touch surface 220a.

In some embodiments, the second smart ring 200b may include at least an audio device 230b for obtaining user voice input (e.g., as a microphone) and/or outputting sound (e.g., as a speaker or conductive). The microphone of the audio device 230b may be the user input device of the user interface 117. The speaker of the audio device 230b may be the user output device of the user interface 117. For example, the user may hold the finger on which the second smart ring 200b is worn close to the mouth of the user for capturing the user's voice (with the audio device 230b, which may include the microphone). In further embodiments, the user may hold the finger close to an ear of the user for listening to audio output (from the audio device 230b, which may include the speaker or conductive). Alternatively, the audio device 230b may be a device configured for bone conduction. The user may hold the audio device 230b or the second smart ring 200b near or on a bone/cartilage structure of the user for conductive sound.

The audio device 230b may be provided at the external circumferential surface of the second smart ring 200b. Where both the microphone and the speaker are included in the audio device 230b, the microphone and the speaker may be provided next to each other (as shown in the non-limiting example of FIG. 2B). In other embodiments, the microphone and the speaker may be provided separately on the second smart ring 200b.

The smart ring 200b may send the microphone input to the primary device 120 with the network device 115 via the network 130 for processing. The smart ring 200b may also send the microphone input to cloud storage and/or processing (e.g., Google Now) with the network device 115 via the network 130. Alternatively, the smart ring 200b may locally process at least a portion of the microphone input.

The speaker and/or the conductive may only output audio when it detects a predetermined gesture. The gesture may be, for example, touching a specific portion of the body (e.g., the ear, bone, face, thumb, and/or the like) with a portion of the ring (e.g., any suitable touch surfaces or areas). Other gestures described herein may also be used.

As illustrated in a non-limiting example, the user may ask a question to Google Now with the microphone. The audio input captured by the microphone may be relayed to the primary device 120 (which, in turn, may send the audio input to Google Now). Alternatively, the audio input may be sent directly to Google Now in the manner described. The smart ring 110 (e.g., the second smart ring 200b) may receive audio output data via the network from the primary device 120 or from other servers on the network 130. The audio output data may be outputted by the speaker when the user places the smart ring 110 over the ear or by the conductive when the user places the smart ring on a bone/cartilage, in response to some gestures.

Figure 2C:
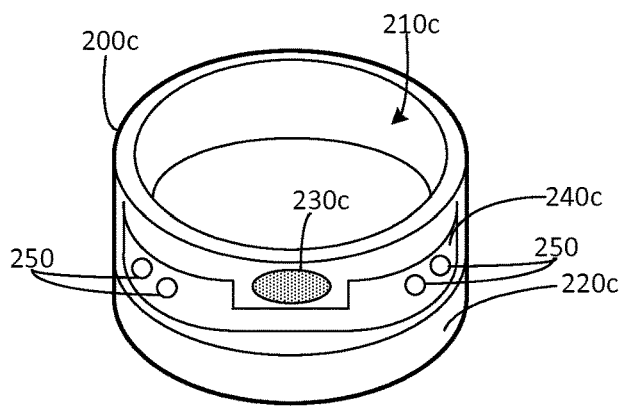
FIG. 2C is a perspective view of a smart ring according to a third embodiment.

FIG. 2C is a perspective view of a smart ring according to a third embodiment. Referring to FIGS. 1-2C, a third smart ring 200c may be a wearable ring such as, but not limited to, the smart ring 110. The structural element 119 of the third smart ring 200c shapes the third smart ring 200c to be an annular ring device having a third cavity 210c for receiving a finger (e.g., the finger 102) or thumb.

The third smart ring 200c may include a third touch surface 220c provided on the external circumferential surface of the third smart ring 200c. The third touch surface 220c may include the user input device and/or the user output device of the user interface 117. For example, the third touch surface 220c may be a touch (display) surface such as the first touch surface 220a or the second touch surface 220b.

In some embodiments, the third smart ring 200c may include at least an audio device 230c for obtaining user voice input (e.g., as a microphone) and/or outputting sound (e.g., as a speaker). For example, the audio device 230c may be an audio device such as, but not limited to, the audio device 230b.

In addition, the third smart ring 200c may include a display screen 240c. The display screen 240c may be the user output device of the user interface 117. The display screen 240c may be a separate screen as the third touch surface 220c. In some embodiments, the display screen 240c may be the only display screen (e.g., user output device of the user interface 117) on the third smart ring 200c. In other embodiments, the display screen 240c may be a display screen in addition to the display provided by the third touch surface 220c. The display screen 240c may be provided at the external circumferential surface of the third smart ring 200c.

At least one light source 250 may be provided the third smart ring 200c as the user output device of the user interface 117. In some embodiments, the light source 250 may be the only user output device of the user interface 117. In other embodiments, the light source 250 may be provided in addition to other displays such as, but not limited to, the display screen 240c and/or the third touch surface 220c. The light source 250 may also include a LCD, a reflective, and/or the like.

The at least one light source 250 may include a light pipe, LED, or the like. The color (or combination of colors), lighting sequence, lighting pattern of the light source 250 may indicate separate output information to the user. For example, a change in color of one of LEDs of the light source 250 may indicate an event, message, time left in a meeting. The light source 250 may display binary or binary coded decimal (BCD) representing a number (e.g., a room number for a meeting). Each digit or letter may be color coded (e.g., based on resistor color code) to be displayed by light emitting devices of the light source 250. Thus, each color of the light source 250 may indicate a different digit. In another example, a combination of two or more LEDs of the light source 250 may indicate a particular person, event, or the like. The color, lighting sequence, and lighting pattern may be predetermined or set by the user via the user interface 127 of the primary device 120.

Figure 2D:
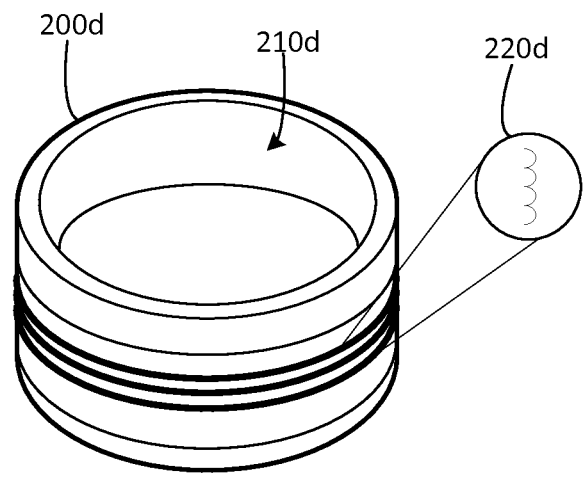
FIG. 2D is a perspective view of a smart ring according to a fourth embodiment.

FIG. 2D is a perspective view of a smart ring according to a fourth embodiment. Referring to FIGS. 1-2D, a fourth smart ring 200d may be a wearable ring such as, but not limited to, the smart ring 110. The structural element 119 of the fourth smart ring 200d shapes the fourth smart ring 200d to be an annular ring device having a fourth cavity 210d for receiving a finger (e.g., the finger 102) or thumb. The fourth smart ring 200d may include one or more or all of features described with respect to the first smart ring 200a, the second smart ring 200b, the third smart ring 200c. In additional the fourth smart ring 200d (the interface 117) may include an electromagnetic device 220d (e.g., a coil) for providing user notification according to various embodiments described herein. In some embodiments, the electromagnetic device 220d (e.g., the coil) may curl around the annular body of the structural element 119 such that when the fourth smart ring 200d is worn on the finger 102, the electromagnetic device 220d (which may be within the structural element 119 and concealed by the structural element 119) may curl around the finger 102. In other embodiments, the electromagnetic device 220d may include coils that do not curl around the annular body of the structural element 119.

Figure 3:
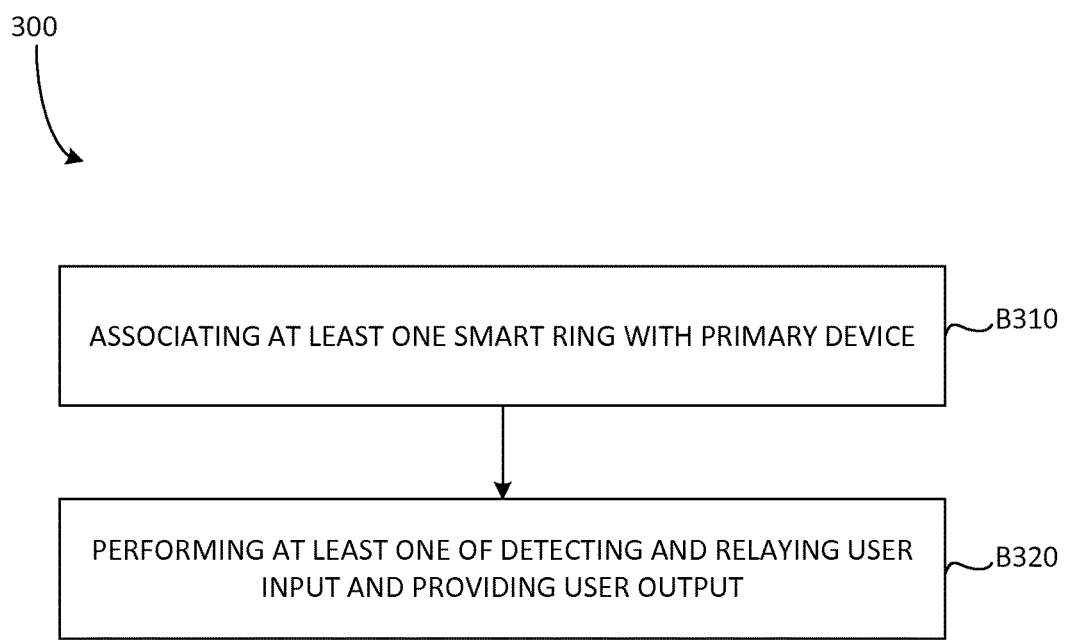
FIG. 3 is a flowchart diagram illustrating an example of a process according to various embodiments.

FIG. 3 is a flowchart diagram illustrating an example of a process 300 according to various embodiments. Referring to FIGS. 1-3, the process 300 may be performed by the processor 111 of the smart ring 110. First at block B310, at least one smart ring (e.g., the smart ring 110) may be associated or paired with the primary device 120. The association step of block B310 may include connecting the smart ring 110 (via the network device 115) and the primary device 120 (via the network device 125) via the network device 130.

In some embodiments, in response to successful network connection, an automatic association/pairing process may be executed. The automatic association process may be performed by the processor 111 of the smart ring 110 and/or the processor 121 of the primary device 120. For example, the memory 113 of the smart ring 110 and the memory 123 of the primary device 120 may each store credentials for communication between the smart ring 110 and the primary device 120. The credentials may be predetermined or based on previous communications in which previous handshake operations between the smart ring 110 and the primary device 120 determined the credentials. In other embodiments, association processes based on analysis of digital photograph/video the smart ring 110, Doppler effect (shift), or the like may be implemented, as described in more detail.

Next at block B320, the smart ring 110 may perform at least one of detecting/relaying user input to the primary device 120 and providing output to the user. For example, the user interface 117 may receive user input from the user and relay the user input (with the processor 111 and the network device 115 of the smart ring 110) to the primary device 120 for processing. The network device 115 of the smart ring 110 may also receive output data from the primary device 120 and covert the output data into a form of user output (e.g., vibration, magnetic pull, display, LED lighting, or the like) for providing notification or information to the user.

Figure 4:
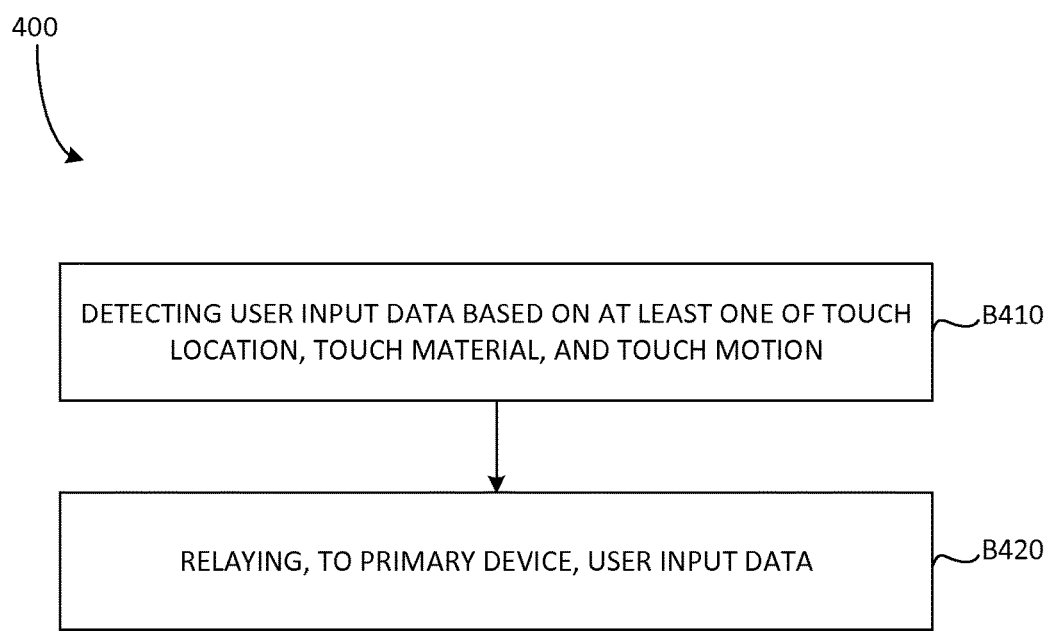
FIG. 4 is a flowchart diagram illustrating an example of an input process according to various embodiments.

FIG. 4 is a flowchart diagram illustrating an example of an input process 400 according to various embodiments. Referring to FIGS. 1-4, the input process 400 may be executed by the processor 111, the network device 115, and the user interface 117 of the smart ring 110. While the input process 400 may be described with respect to one smart ring (e.g., the smart ring 110) being provided on one finger (e.g., the finger 102 of the hand 105 of the user), one of ordinary skill in the art would appreciate that the input process 400 may be implemented for a multi-ring system including two or more smart rings, each provided on a same or different finger of a same or different hand.

First at block B410, the user interface 117 of the smart ring 110 may detect a user input based on at least in part of touch area, touch material, and touch motion. The user interface 117 may detect the user input when the smart ring 110 is worn on the finger 102.

Touch area may refer to a portion (e.g., a surface area) of the user input device of the user interface 117. In particular, the user input device of the user interface 117 may include a touch surface (e.g., the first touch surface 220a, the second touch surface 220b, the third touch surface 220c, and/or the like). The touch surface may be configured to detect different input when different portions (e.g., areas) of the touch surface is touched. In other words, the touch surface may be configured to transmit a first signal in response to a first area of the touch surface being touched, and a second signal in response to a second area of the touch surface being touched. The first and second signals are separate signals, and the first and second areas are different areas of the touch surface.

Touch material may refer to a material (having material properties) that the user uses to touch or otherwise contact the touch surface (e.g., the user input device of the user interface 117). Material properties may include capacitance, rigidity, resistance, surface acoustic wave, infrared waves, optical imaging, and/or the like. The touch surfaces may be configured to detect different inputs based on the material properties associated with the user touch.

For example, contacting the touch surface (on an area of the surface) with flesh of a finger may yield a first user input, and contacting the touch surface (e.g., on a same area of the surface) with the fingernail of a finger may yield a second input. Different portions of the body (e.g., flesh, nail, hair, hear, nose, finger, hand, arm, and the like) may be associated with different material properties that are distinguishable by the touch surface. Therefore, different portions of the body, when contacting a same portion of the touch surface, may cause the touch surface to detect different user inputs.

In addition, different articles of clothing, accessories, or other items (having different material properties) associated with the user may be used as additional sources for different inputs. Such articles of clothing may include, for example, belt buckle, belt, shirts, pants, hats, buttons, earrings, tattoos (including identification such as radio-frequency identifications (RFIDs)), magnetic field-enabled items, and/or the like.

Different touch motions (commonly referred to as "gestures") may distinguish different user inputs. Touch motions include, but not limited to, compression, touching, holding, tapping, rubbing, scratching, sliding, turning, tilting, shifting, combination thereof, and/or the like. Transitions from one touch motion to another touch motion may also be detected as a separate input. Implementations of touch motions as separate user inputs may include the simple touch context, in which one smart ring is provided on one finger for finger-to-ring and fingers-to-ring interactions. In addition, implantations of touch motions as separate user inputs may extend to the multi-touch context, in which two or more smart rings are provided on two or more fingers for finger-to-ring, fingers-to-ring, finger-to-rings, fingers-to-rings, ring-to-ring, and rings-to-rings interactions.

For simplicity, various touch motions may be described and illustrated with respect to finger gestures herein. One of ordinary skill in the art would appreciate that systems and processes using touch materials other than the finger (e.g., with articles of clothing as described) may be implemented in a similar manner.

Next at block B420, the network device 125 of the smart ring 110 may relay the user input data to the primary device 120. For example, the processor 111 of the smart ring 110 may transform the signals detected by the user interface 117 of the smart ring 110 into transmittable user input data. Then, the network device 115 may transmit the user input data over the network 130 to the primary device 120.

Figure 5A:
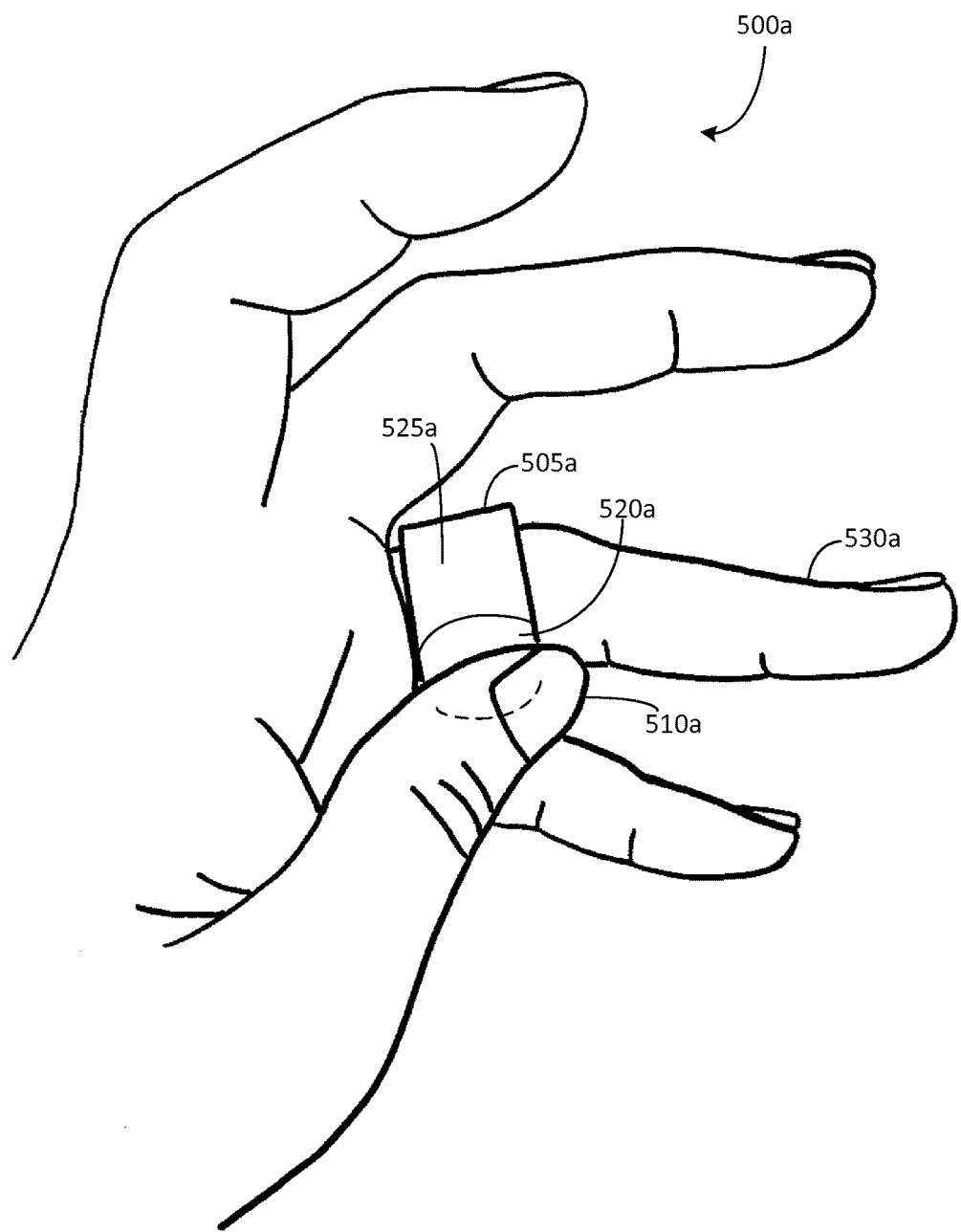
FIG. 5A is a perspective view of an input gesture being carried out on a smart ring according to various embodiments.

FIG. 5A is a perspective view of an input gesture 500a being carried out on a smart ring according to various embodiments. Referring to FIGS. 1-5A, the input gesture 500a may be a finger-to-ring touch motion detected by a first touch area 520a of a touch surface 525a provided on a smart ring 505a. The smart ring 505a may be a smart ring such as, but not limited to, the smart ring 110, the first smart ring 200a, the second smart ring 200b, and the third smart ring 200c. The smart ring 505a may be worn by the user on a reference finger 530a. The input finger 510a may be any finger of a same or different hand of the reference finger 530a.

The touch surface 525a may be the user input device of the user interface 117. For example, the touch surface 525a may be a touch surface such as, but not limited to, the first touch surface 220a, the second touch surface 220b, the third touch surface 220c, and/or the like. The first touch area 520a may detect the compression by the flesh of an input finger 510a as a first input. The touch motion associated with the input gesture 500a may be at least one of tapping, rubbing, holding (for a predetermined period of time, e.g., 1 second, 2 second, 3 second, and the like), sliding, and a combination or repetition thereof.

Figure 5B:
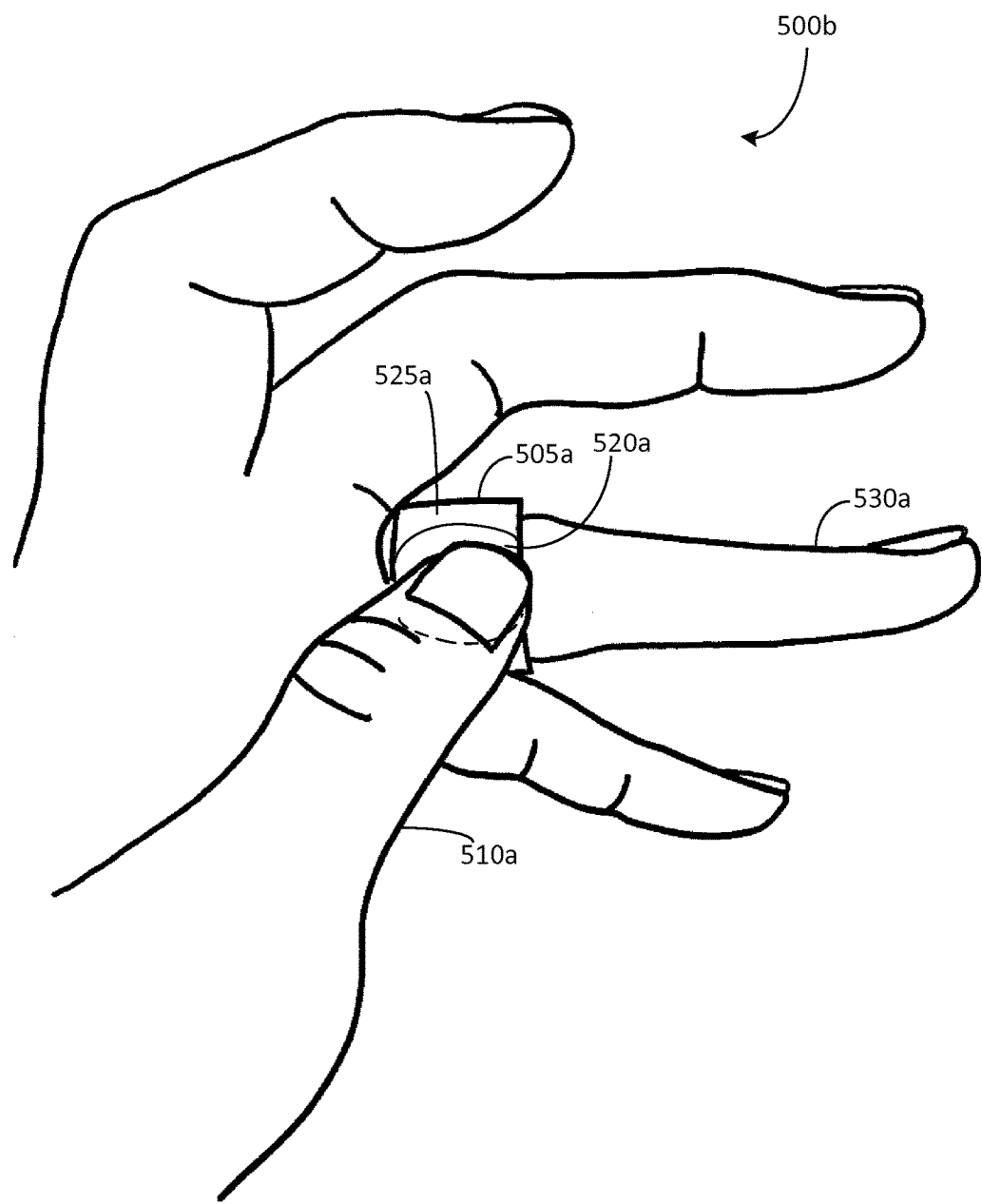
FIG. 5B is a perspective view of an input gesture being carried out on a smart ring according to various embodiments.

FIG. 5B is a perspective view of an input gesture 500b being carried out on a smart ring according to various embodiments. Referring to FIGS. 1-5B, the input gesture 500b may be a finger-to-ring touch motion detected by a second touch area 520b of the touch surface 525a provided on the smart ring 505a, worn on the reference finger 530a. The second touch area 520b may be different from the first touch area 520a. The second touch area 520b may detect the compression by the flesh of the input finger 510a as a second input.

In some embodiments, the second input may be (previously determined) different from the first input. In other embodiments, the second input may be (previously determined) the same as the first input. The touch motion associated with the input gesture 500b may include, but not limited to, tapping, rubbing, scratching, holding (for a predetermined period of time, e.g., 1 second, 2 second, 3 second, and the like), sliding, and a combination or repetition thereof.

Figure 5C:
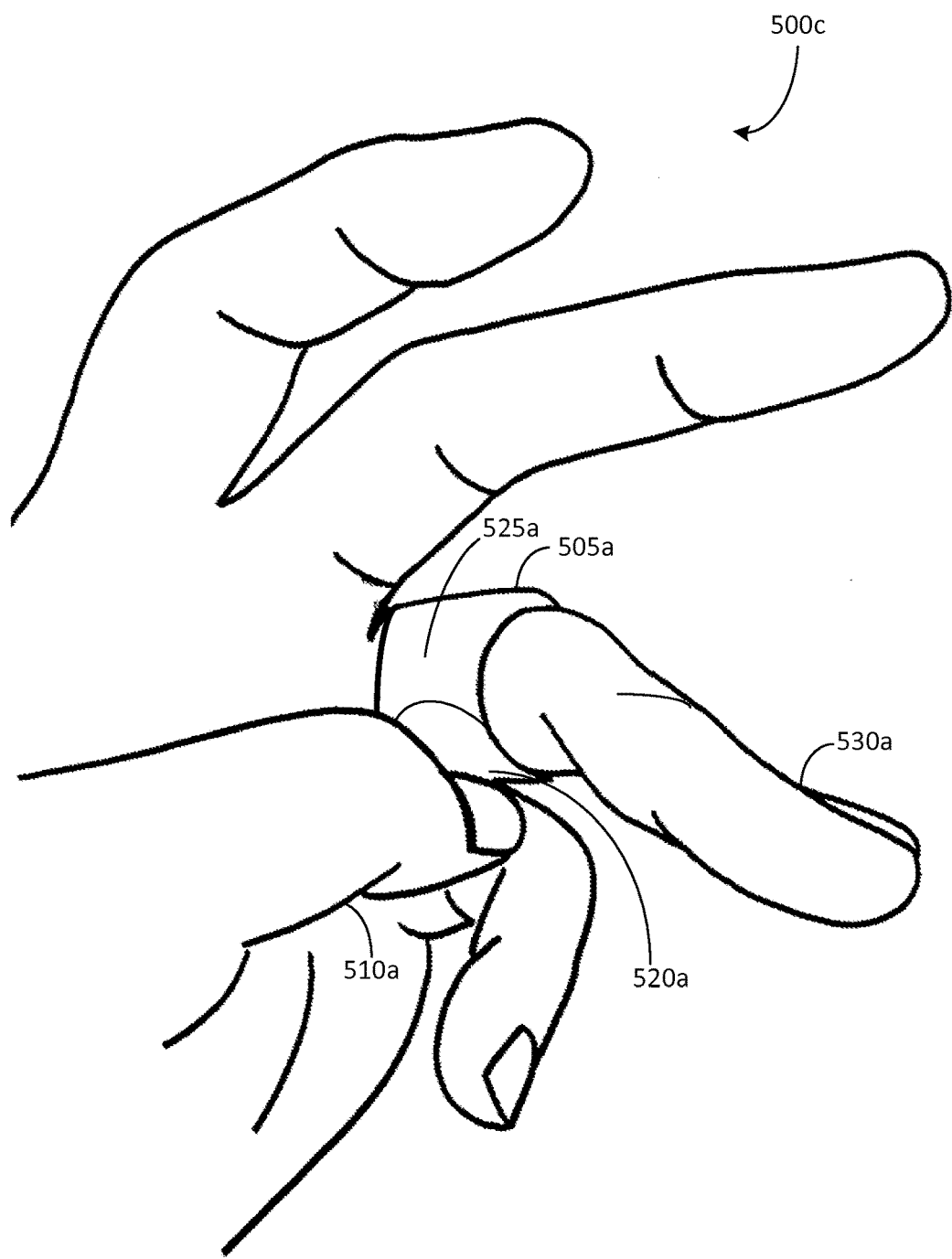
FIG. 5C is a perspective view of an input gesture being carried out on a smart ring according to various embodiments.

FIG. 5C is a perspective view of an input gesture 500c being carried out on a smart ring according to various embodiments. Referring to FIGS. 1-5C, the input gesture 500c may be a finger-to-ring touch motion detected by the first touch area 520a of the touch surface 525a provided on the smart ring 505a, worn on the reference finger 530a. The first touch area 520a may detect the touch (e.g., a compression) by the fingernail of the input finger 510a as a third input.

In some embodiments, the third input may be (previously determined) different from the first input and/or the second input. In other embodiments, the second input may be (previously determined) the same as the first input and/or the second input. The touch motion associated with the input gesture 500c may include, but not limited to, tapping, rubbing, holding (for a predetermined period of time, e.g., 1 second, 2 second, 3 second, and the like), sliding, and a combination or repetition thereof.

Figure 5D:
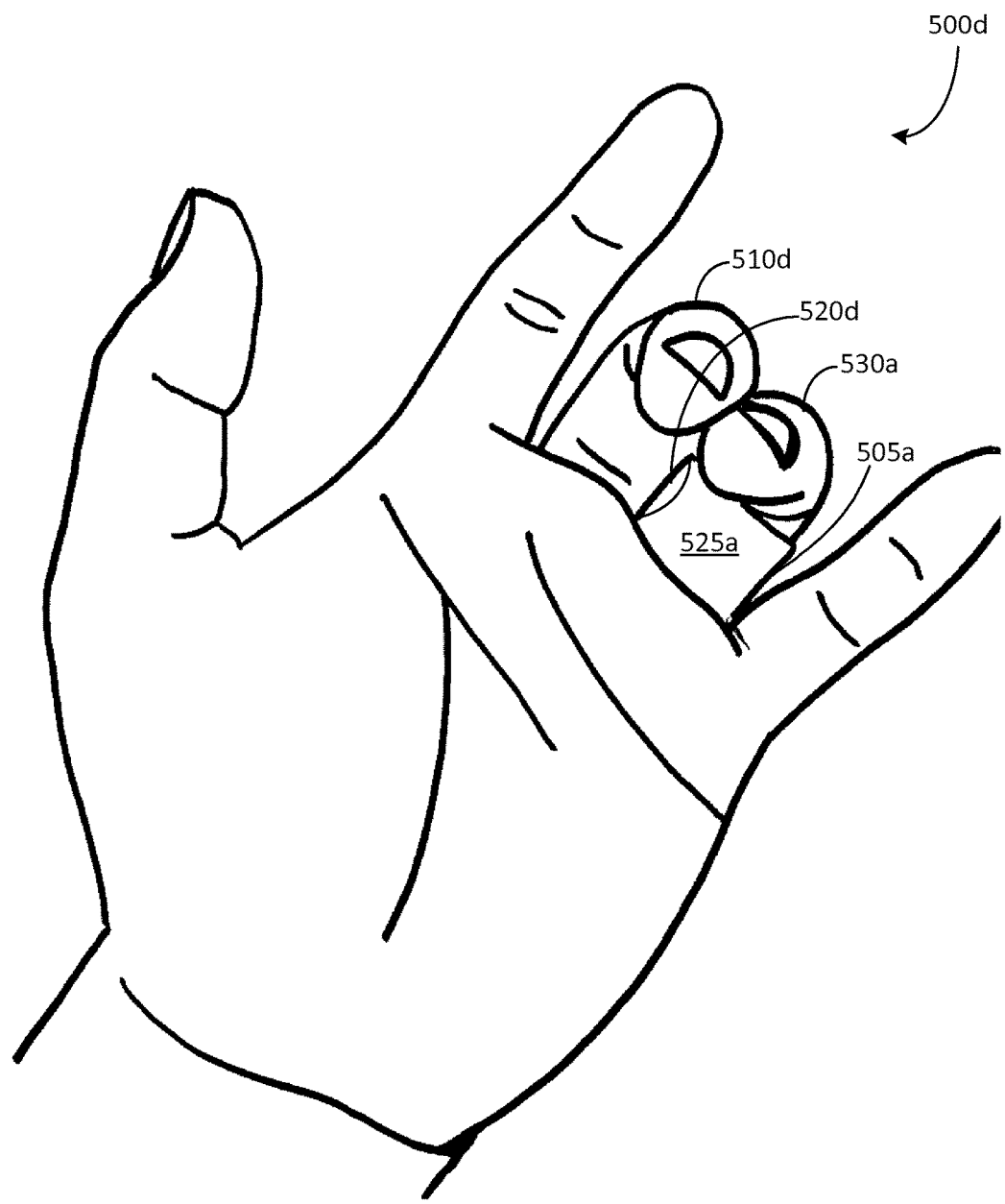
FIG. 5D is a perspective view of an input gesture being carried out on a smart ring according to various embodiments.

FIG. 5D is a perspective view of an input gesture 500d being carried out on a smart ring according to various embodiments. Referring to FIGS. 1-5D, the input gesture 500d may be a finger-to-ring touch motion detected by the fourth touch area 520d of the touch surface 525a provided on the smart ring 505a, worn on the reference finger 530a. The fourth touch area 520d may be a same touch area as the first touch area 520a. The fourth touch area 520d may detect the compression by flesh of an input finger 510d as a fourth input. The input finger 510d may be a finger adjacent to the reference finger 530a. In other embodiments, the input finger may not be a finger adjacent to the reference finger 530a.

In some embodiments, the fourth input may be (previously determined) different from the first input, the second input, and/or the third input. In other embodiments, the second input may be (previously determined) the first input, the second input, and/or the third input. The touch motion associated with the input gesture 500d may include, but not limited to, tapping, rubbing (achieved by two adjacent fingers rubbing against each other at where the smart ring 505a is), holding (closing the two adjacent fingers together for a predetermined period of time, e.g., 1 second, 2 second, 3 second, and the like), sliding, and a combination or repetition thereof.

Figure 5E:
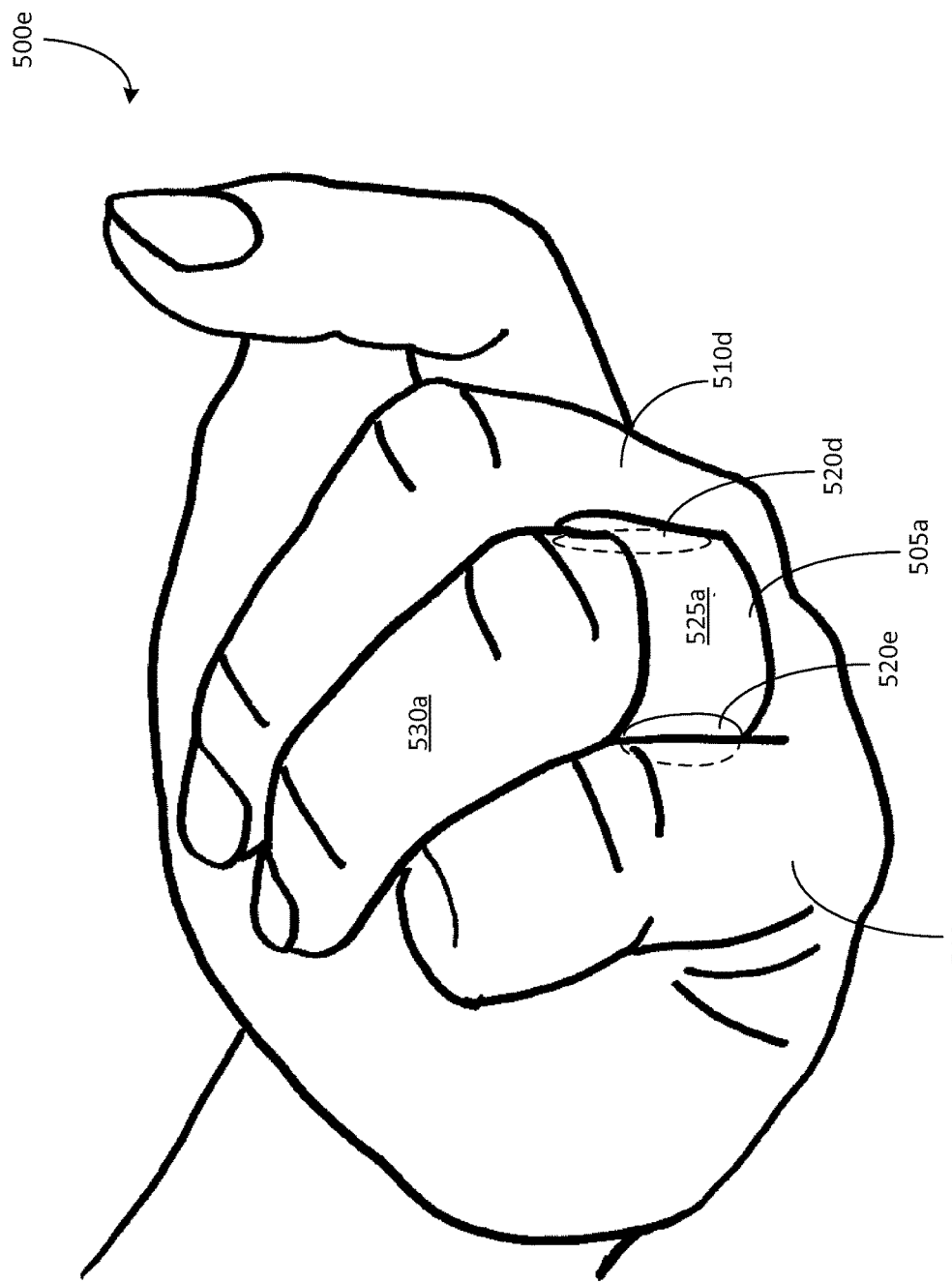
FIG. 5E is a perspective view of an input gesture being carried out on a smart ring according to various embodiments.

FIG. 5E is a perspective view of an input gesture 500e being carried out on a smart ring according to various embodiments. Referring to FIGS. 1-5E, the input gesture 500e may be a fingers-to-ring touch motion detected by the fourth touch area 520d and the fifth touch area 520e of the touch surface 525a provided on the smart ring 505a, worn on the reference finger 530a. The fourth touch area 520d may detect the compression by flesh of the input finger 510d. Simultaneously, the fifth touch area 520e may detect the compression by flesh of the input finger 510e. The input finger 510e may be a finger adjacent to the reference finger 530a. The touch surface 525a may detected the combination of compressions in the fourth touch area 520d and the fifth touch area 520e as a fifth input.

In some embodiments, the fifth input may be (previously determined) different from the first input, the second input, the third input, and/or the fourth input. In other embodiments, the second input may be (previously determined) the first input, the second input, the third input, and/or the fourth input. The touch motion associated with the input gesture 500e may include, but not limited to, tapping, rubbing (achieved by three adjacent fingers rubbing against each other at where the smart ring 505a is), holding (closing the three adjacent fingers together for a predetermined period of time, e.g., 1 second, 2 second, 3 second, and the like), sliding, and a combination or repetition thereof.

Figure 5F:
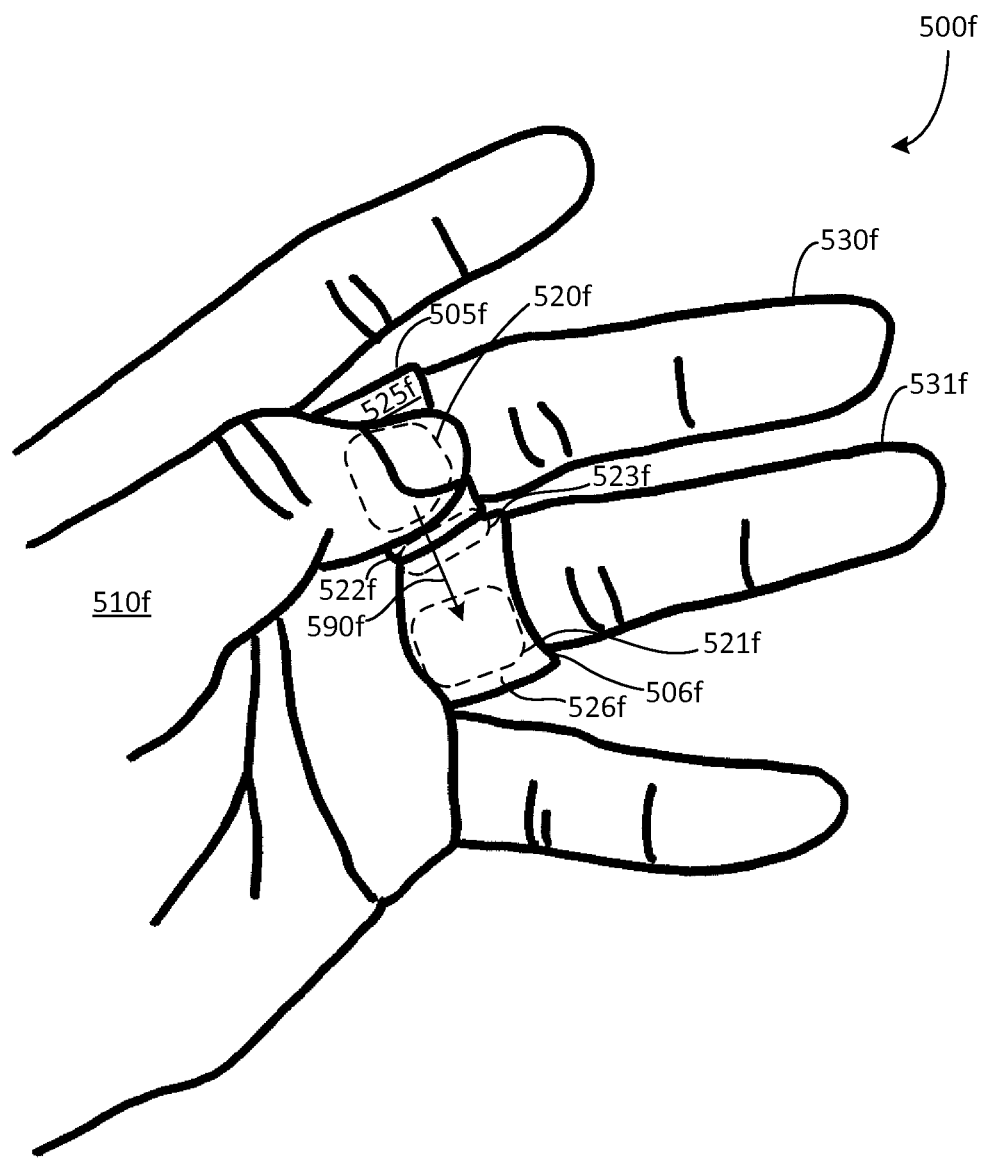
FIG. 5F is a perspective view of an input gesture being carried out on a smart ring according to various embodiments.
Figure 5G:
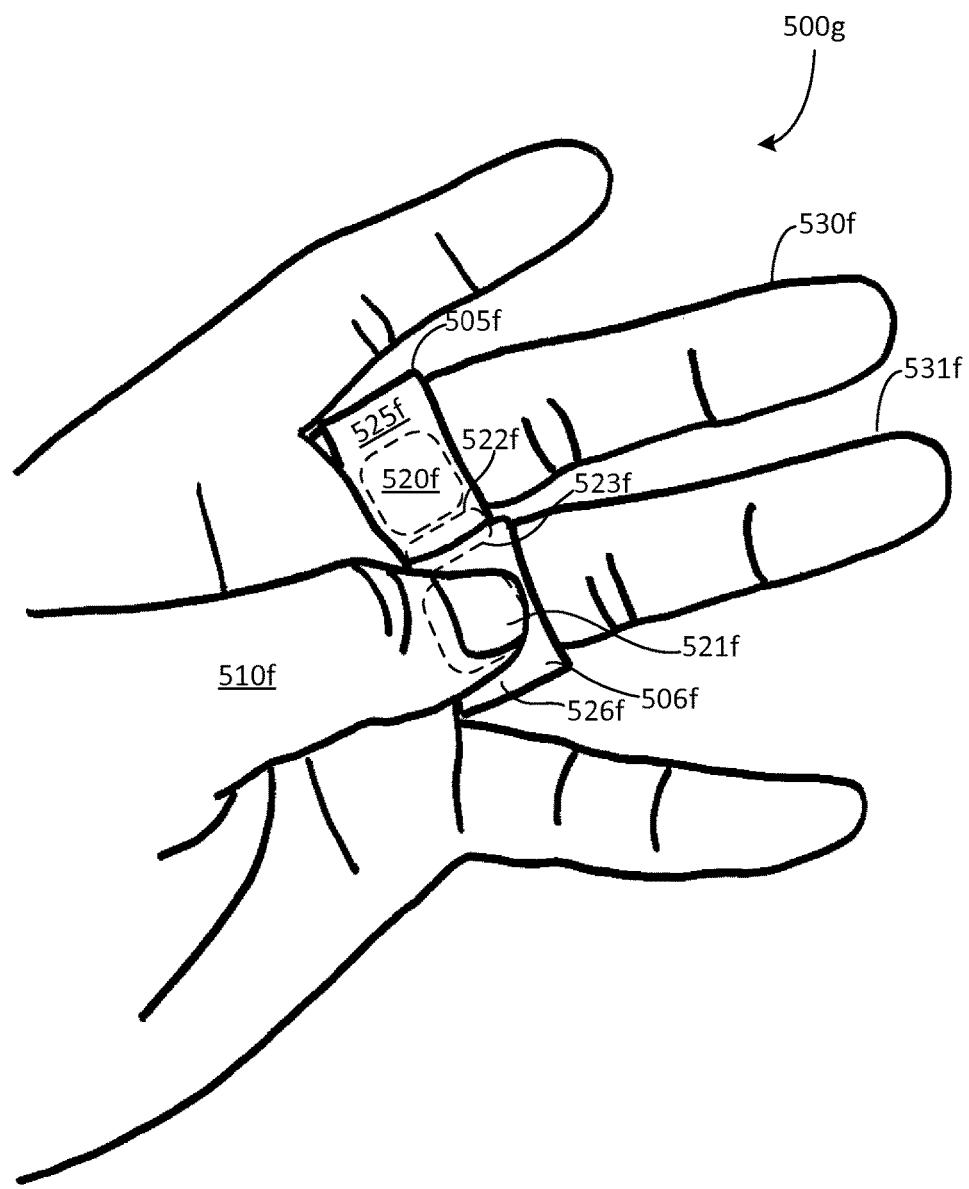
FIG. 5G is a perspective view of an input gesture being carried out on a smart ring according to various embodiments.

FIG. 5F is a perspective view of an input gesture 500f being carried out on a smart ring according to various embodiments. FIG. 5G is a perspective view of an input gesture 500g according to various embodiments. Referring to FIGS. 1-5G, the input gestures 500f and 500g may be a combination gesture (e.g., a fingers-to-rings touch motion) involving using an input finger (thumb) 510f sliding across from an initial touch area 520f of a first smart ring 505f to a final touch area 521f of a second smart ring 506f. In other words, the combination gesture may be a transition from the input gesture 500f to the input gesture 500g.

The first smart ring 505f and the second smart ring 506f may each be a smart ring such as, but not limited to, the smart ring 110, the first smart ring 200a, the second smart ring 200b, and the third smart ring 200c. The first smart ring 505f may include a first touch surface 525f, which may include at least the initial touch area 520f and the first complementary touch area 522f. The second smart ring 506f may include a second touch surface 526f, which may include at least the final touch area 521f and the second complementary touch area 523f. Each of the first touch surface 525f and second touch surface 526 may be a user input device of the user interface 117 (such as, but not limited to, the first touch surface 220a, second touch surface 220b, third touch surface 220c, and the like).

The first smart ring 505f may be worn on a first reference finger 530f. The second smart ring 506f may be worn on a second reference finger 531f. In some embodiments, the first smart ring 505f and the second smart ring 506f may be worn on adjacent fingers (i.e., the first reference finger 530f and the second reference finger 531f are adjacent fingers). A first complementary touch area 522f of the first smart ring 505f and a second complementary touch area 523f of the second smart ring 523f may be in contact with each other (i.e., ring-to-ring contact). For example, the detection of the combination gesture may or may not require the first complementary touch area 522f contacting the second complementary touch area 523f (in addition to the input finger 510f sliding from the initial touch area 520f to the final touch area 521f).

In other embodiments, the first smart ring 505f and the second smart ring 506f may be worn on fingers not adjacent to one another (i.e., there may be at least one finger between the first reference finger 530f and the second reference finger 531f). The detection of the combination gesture may be independent of the first complementary touch area 522f contacting the second complementary touch area 523f (in addition to the input finger 510f sliding from the initial touch area 520f to the final touch area 521f).

For input gesture 500f, the initial touch area 520f may detect the compression by contact of the input finger 510f. The input finger 510f may move (e.g., slide, swipe, or scratch) across the first touch surface 525f and second touch surface 526f in the first direction 590, where such movement/contact may be detected by the first touch surface 525f and second touch surface 526f. In particular, the first complementary touch area 522f, the second complementary touch area 523f, and the final touch area 521f may detect the contact made with the input finger 510f, in that order. For input gesture 500f, the final touch area 521f may detect the compression of the input finger 510f, which may indicate a completion of the combination gesture. One of ordinary skill in the art would appreciate that the directionality, speed, touch motion type, touch material, and/or the like of the touch motion for the combination input gesture as described may be suitably varied for detecting different inputs.

Figure 5H:
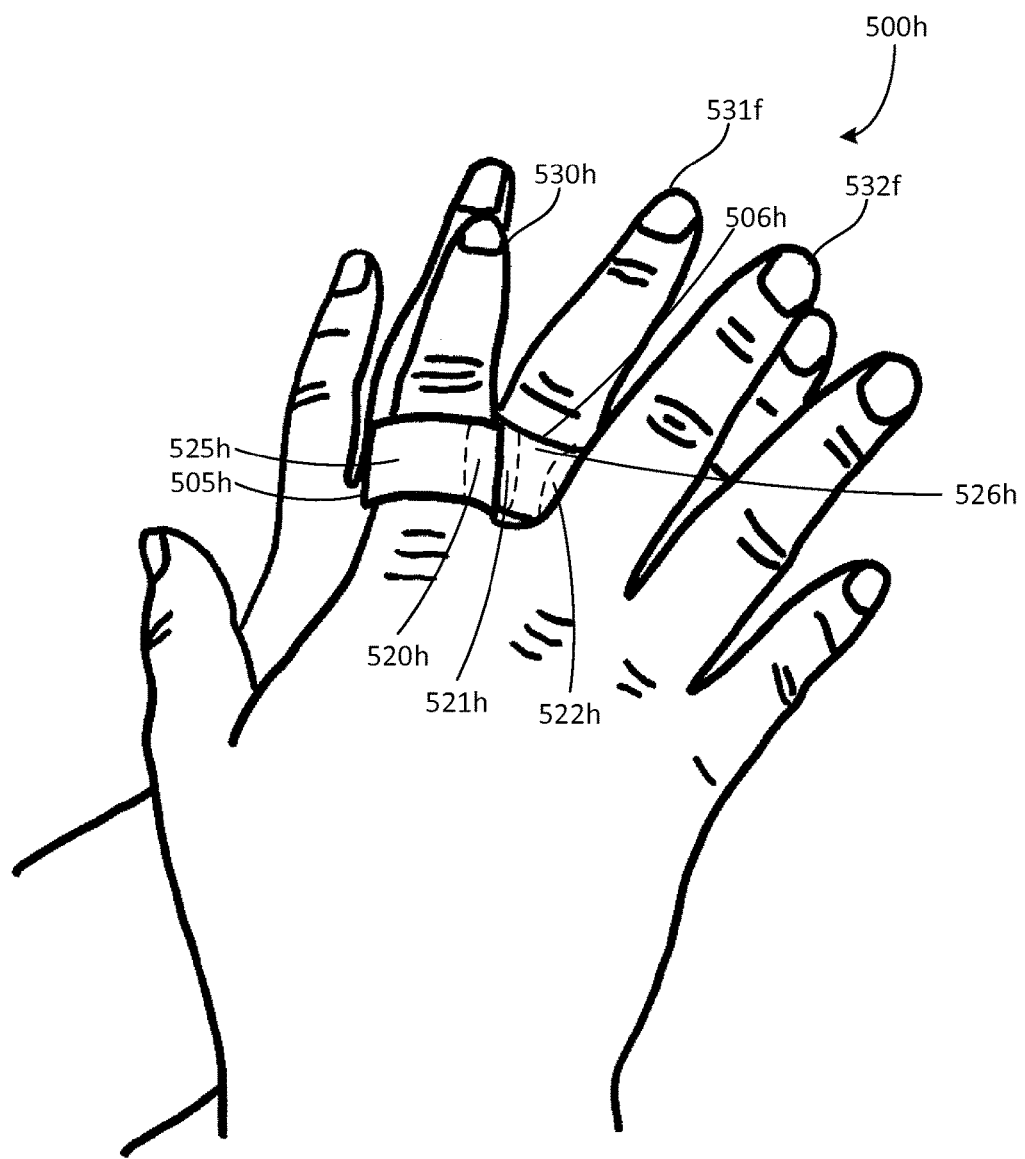
FIG. 5H is a perspective view of an input gesture being carried out on a smart ring according to various embodiments.

FIG. 5H is a perspective view of an input gesture 500h being carried out on a smart ring according to various embodiments. Referring to FIGS. 1-5H, the input gesture 500h may be a finger(s)-to-rings and/or ring-to-ring touch motion detected by a first ring touch area 520h, a second ring touch area 521h, and/or a finger touch area 522h, according to various embodiments. The first ring touch area 520h may be provided on a first touch surface 525h of a first smart ring 505h, worn on a first reference finger 530h. The second ring touch area 521h may be provided on a second touch surface 526h of a second smart ring 506h, worn on a second reference finger 531h. Each of the first and second smart rings 505h, 506h may be a smart ring such as, but not limited to, the smart ring 110, the first smart ring 200a, the second smart ring 200b, and the third smart ring 200c. Each of the first and second touch surfaces 525h, 526h may be the user input device of the user interface 117. For example, each of the first and second touch surfaces 525h, 526h may be a touch surface such as, but not limited to, the first touch surface 220a, the second touch surface 220b, the third touch surface 220c, and/or the like. The first and second ring touch areas 520h, 521h and the finger touch area 522h may detect the compression by the flesh of an input finger 532f (e.g., compressing the finger touch area 522h) or by another ring (e.g., the first and second ring touch areas 520h, 521h may detect contacting each other) The first reference finger 530h and the second reference finger 531h may be fingers on different hands of the user.

In various embodiments, the input gesture 500h may be referred to as an "interlacing fingers" hand gesture involving, for example, finger(s)-to-rings and/or ring-to-ring touch motion as described. Such gestures may include gestures concerning to a left hand over a right hand or the right hand over the left hand. For example, the input detected corresponding to the input gesture 500h may include at least one of the first and second ring touch areas 520h, 521h contacting each other and the input finger 532f compressing the finger touch area 522h. In other words, the input gesture 500h may include a combination of ring-to-ring and finger-to-ring touch motions. In other embodiments, the input gesture 500h may include any ring(s)-to-ring(s) touch motion, finger(s)-to-ring(s) touch motion, a combination thereof, and/or the like. The touch motion may be any touch motion described herein.

Figure 5I:
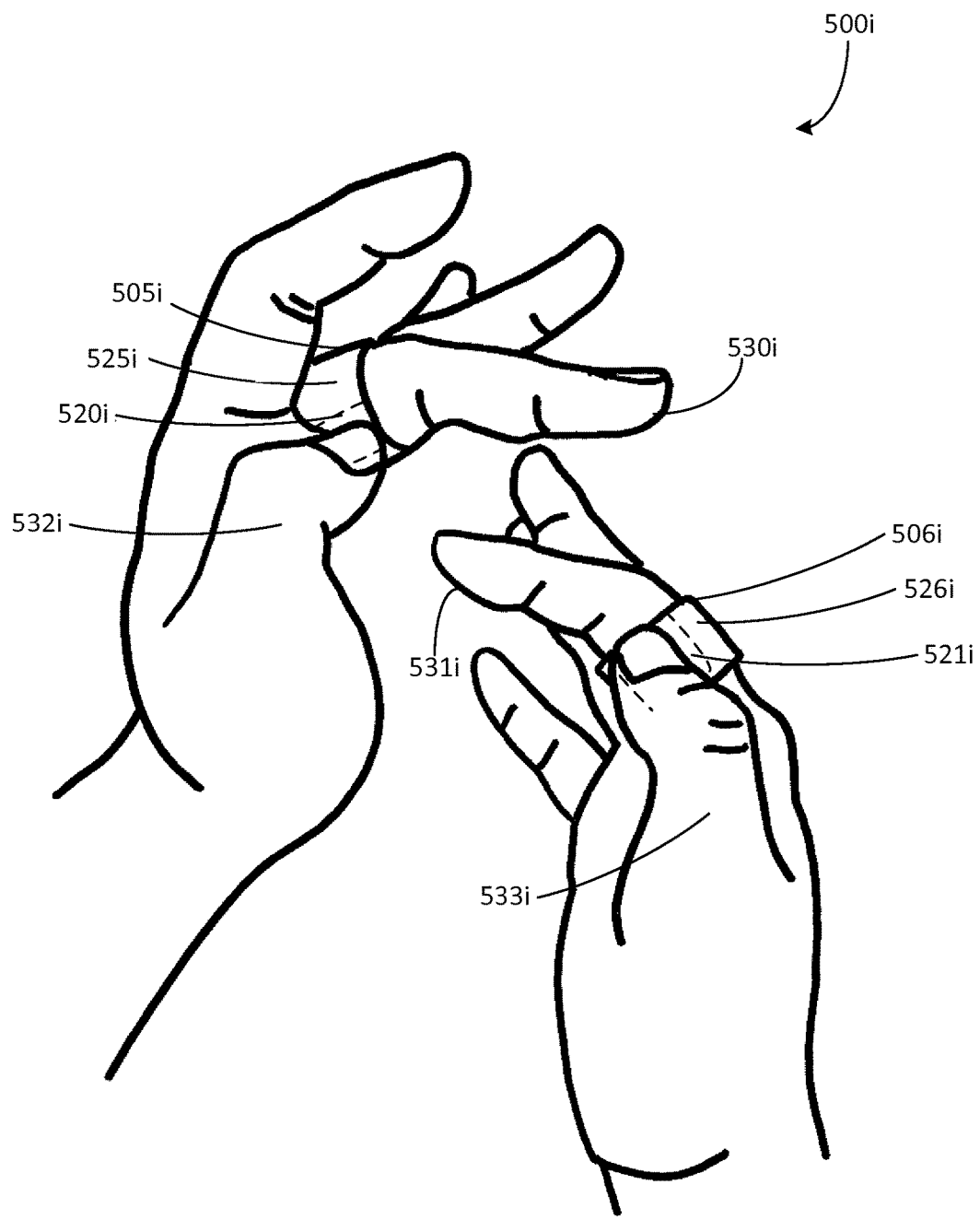
FIG. 5I is a perspective view of an input gesture being carried out on a smart ring according to various embodiments.

FIG. 5I is a perspective view of an input gesture 500i being carried out on a smart ring according to various embodiments. Referring to FIGS. 1-5I, the input gesture 500i may be a fingers-to-rings touch motion detected by a primary ring touch area 520i and a secondary ring touch area 521i, according to various embodiments. The primary ring touch area 520i may be provided on a first touch surface 525i of a primary smart ring 505i, worn on a primary reference finger 530i. The secondary ring touch area 521i may be provided on a secondary touch surface 526i of a secondary smart ring 506i, worn on a secondary reference finger 531i. Each of the primary and secondary smart rings 505i, 506i may be a smart ring such as, but not limited to, the smart ring 110, the first smart ring 200a, the second smart ring 200b, and the third smart ring 200c. Each of the primary and secondary touch surfaces 525i, 526i may be the user input device of the user interface 117. For example, each of the primary and secondary touch surfaces 525i, 526i may be a touch surface such as, but not limited to, the first touch surface 220a, the second touch surface 220b, the third touch surface 220c, and/or the like. The primary and secondary ring touch areas 520i, 521i may detect the compression by the material of a primary input finger 532i (e.g., compressing the primary touch area 520i) or by material of a secondary input finger 533i (e.g., compressing the secondary touch area 521i). The primary reference finger 530i and the secondary reference finger 531i may be fingers on different hands of the user.

In various embodiments, the input gesture 500i may be referred to as a combination hand gesture involving, for example, two or more finger(s)-to-ring(s) touch motion as described. For example, the input detected corresponding to the input gesture 500i may include at least one of the material of the primary input finger 532i compressing the primary touch area 520i and/or the material of the secondary input finger 533i compressing the secondary touch area 521i. The touch motion may be any touch motion described herein.

In addition, the smart ring 110 may be provided with an activation gesture. In response to detecting the activation gesture, the smart ring 110 may be configured to begin detecting various hand gestures and/or output various information to the user as described, after a period in a standby, off, or sleep mode. This is to prevent accidental user inputs being detected when the user does not intend to input with any gestures. The activation gesture may be any suitable hand gesture described herein. For example, the activation gesture may include user input in any suitable frequency, sequence, combination, and/or touch motion as described. The activation gesture may also be interacting, by a finger or another smart ring, an element (e.g., a button) of the user interface 117 of the smart ring 110. In various embodiments, the activation gesture (i.e., start sequence) may be different from any input gesture. In other embodiments, the activation gesture may be the same as at least one of the input gestures. In some embodiments, each input gesture may include one to four input gestures (as a combination or transition) as described herein. The activation gesture may include five or more input gestures (as a combination or transition) as described herein.

In some embodiments, each of the smart rings described herein may be configured to sense user input using electric and/or capacitance sensing interface. In particular embodiments, two or more smart rings each worn on a different finger may sense user input (e.g., user touch) electrically or capacitively. Electrical and/or capacitive characteristics corresponding to a user touch with a different finger on a different one of the two or more smart rings may vary. In some cases, finger-to-finger gestures may be detected with the electric and/or capacitance sensing interface. For example, movement of the fingers may cause shift in the electromagnetic field generated by the smart rings or capacitance on the interface 117 of the smart rings. Based on such shifts, separate user inputs may be detected. Accordingly, separate user inputs may be detected based on the various electrical and capacitive characteristics.

One of ordinary skill in the art would appreciate that the hand gestures (e.g., input gestures 500a-500i) described herein are for illustrative purposes and should not be construed as limiting. Hand gestures may include any suitable finger(s)-to-ring(s), finger(s)-to-finger(s), ring(s)-to-ring(s), finger(s)-to-finger(s), a combination and/or transition therefore, and/or the like. For example, a same or different touch surface may be touched (with any suitable touch motion) by different fingers, in different combinations and/or sequences, and/or at different speeds for different input gestures corresponding to different inputs.

According to various embodiments, each of the smart ring 110 may provide user output to the user (e.g., as described with respect to block B320 of the process 300). In particular embodiments, the user output device of the user interface 117 may be configured to display texts, graphics, lights, sounds, vibrations, magnetic push/pull, and/or the like for outputting information and/or notification to the user.

Figure 6:
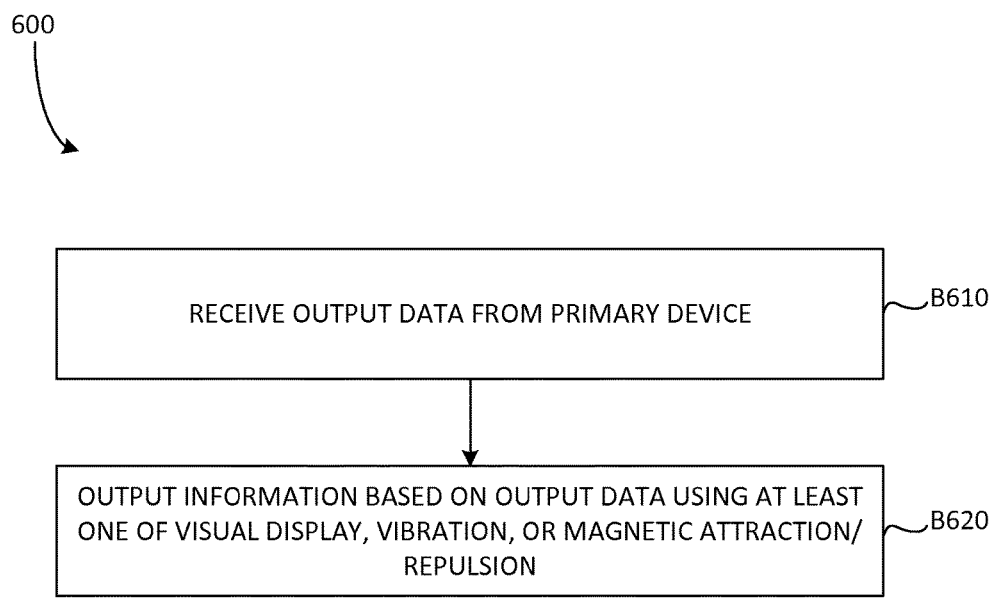
FIG. 6 is a flowchart diagram illustrating an example of an output process according to various embodiments.

FIG. 6 is a flowchart diagram illustrating an example of an output process 600 according to various embodiments. Referring to FIGS. 1-6, the output process 600 may be executed by the processor 111, the memory 113, the network device 115, and the user interface 117 of the smart ring 110. While the output process 600 may be described with respect to one smart ring (e.g., the smart ring 110) being provided on one finger (e.g., the finger 102 of the hand 105 of the user), one of ordinary skill in the art would appreciate that the output process 600 may be implemented for a multi-ring system (as described with the combination display) including two or more smart rings, each provided on a separate finger of a same or different hand.

First at block B610, the smart ring 110 may (via network device 115) receive output data from the primary device 120. The output data may be cached at the memory 113. In other embodiments, at least a portion of the output data may be stored locally at the memory 113 of the smart ring 110. Next at block B620, the smart ring may (via the user interface 117) output information based on the output data using at least one of visual display, vibration, or magnetic attraction/repulsion. For example, the user output device of the user interface 117 may output information in the manner described.

Figure 7A:
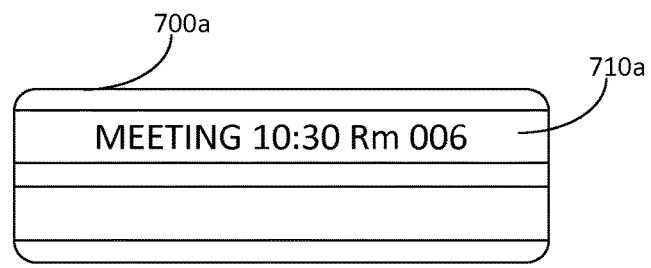
FIG. 7A is a front view of a smart ring output interface according to a first embodiment.

FIG. 7A is a front view of a smart ring output interface according to a first embodiment. A first smart ring output interface 700a may be outputted by the user output device of the user interface 117 of the smart ring 110. In various embodiments, the first smart ring output interface 700a may be the output viewed by the user when the user views the ring for output. The first smart ring output interface 700a may include a user output screen 710a such as, but not limited to, the first touch surface 220a, the second touch surface 220b, the third touch surface 220c, and/or the like.

The first smart ring output interface 700a may be displaying, as in the non-limiting example illustrated by FIG. 7A, a meeting time and location. In various embodiments, the first smart ring output interface 700a may be a small display (e.g., 5 mm by 20 mm). The letters may be shown in sequence and the color may change to denote a different part of a word. The first smart ring output interface 700a may display additional texts such as the name of a sender, a message, time graphics, a combination thereof, and/or the like. The color of a text or graphics may change based on status (e.g., events, message, time left in meeting, and/or the like). In some embodiments, the content (e.g., the texts, graphics, light patterns, and/or the like) may be displayed by the first smart ring output interface 700a in response to or during a gesture. For example, the user may hold a first portion (e.g., a first touch area) of the first smart ring output interface 700a to trigger the content being displayed by the first smart ring output interface 700a. When the user releases the first portion, the first smart ring output interface 700a may cease to display the content.

Figure 7B:
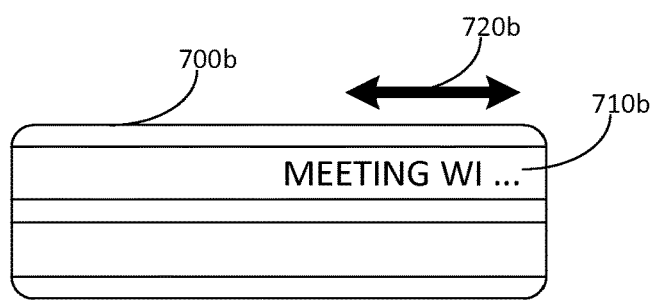
FIG. 7B is a front view of a smart ring output interface according to a second embodiment.

FIG. 7B is a front view of a smart ring output interface according to a second embodiment. A second smart ring output interface 700b may be outputted by the user output device of the user interface 117 of the smart ring 110. In various embodiments, the second smart ring output interface 700b may be the output viewed by the user when the user views the smart ring for output. The second smart ring output interface 700a may include a user output screen 710b such as, but not limited to, the first touch surface 220a, the second touch surface 220b, the third touch surface 220c, the user output screen 710a, and/or the like.

In some embodiments, the user output screen 710b may display at least a portion of the content. The content may be scrolled by the user in any suitable direction (e.g., longitudinal directions 720b) by user interaction with the user output screen 710b or other user interactive elements provided by the interface 117. In the non-limiting example provided by FIG. 7B, the user may scroll the user output screen 710b to the left (of the longitudinal directions 720b) to reveal additional content not currently being displayed.

Figure 7C:
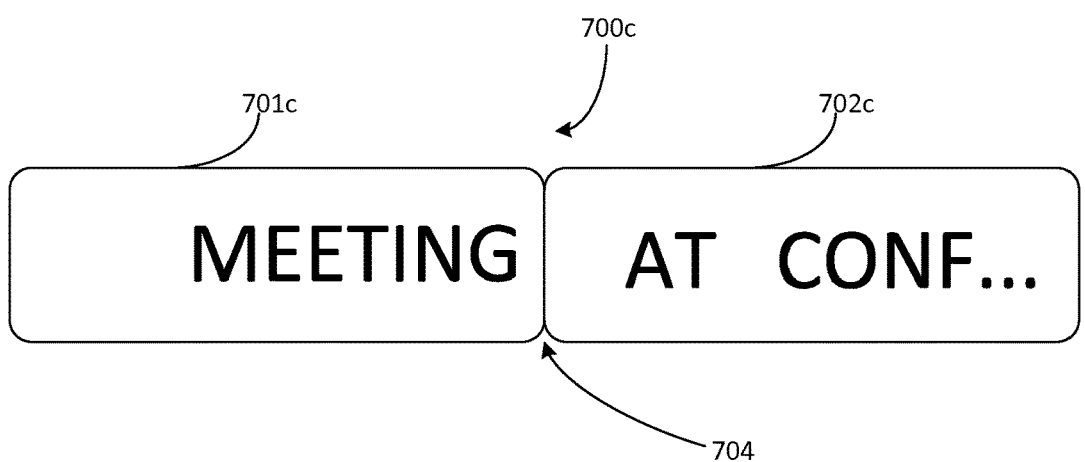
FIG. 7C is a front view of a combination display including two smart ring output interfaces according to a third various embodiment.

FIG. 7C is a front view of a combination display 700c including two smart ring output interfaces according to a third embodiment. The combination display 700c may be a combined display including outputs by both displays (e.g., a third smart ring output interface 701c and a fourth smart ring output interface 702c) of two smart rings (e.g., the smart ring 110). In some embodiments, the user may view the combination display 700c as the two smart rings are held together by the fingers of the user (at an edge 704). The fingers may or may not be adjacent fingers on a same hand, as long as the smart rings could be brought into contact with one another. The touching of the smart rings may or may not be a precondition to displaying the content. In other embodiments, the two smart rings may not be in contact.

Accordingly, a first portion of the content may be displayed on the third smart ring output interface 701c while a second different portion of the content may be displayed on the fourth smart ring output interface 702d. While two smart rings are illustrated for clarity, one of ordinary skills in the art would appreciate that three or more of smart rings may be used in the same manner for displaying the content. In other words, the content may be displayed across a plurality of display surfaces of the smart rings (e.g., two or more) to increase the surface area for displaying the content.

Figure 7D:
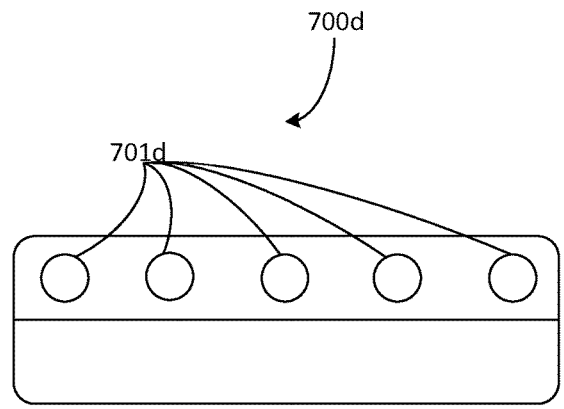
FIG. 7D is a front view of a LED output interface according to some embodiments.

FIG. 7D is a front view of a LED output interface according to some embodiments. The LED output interface 700d may be the user output device of the user interface 117 of the smart ring 110. In various embodiments, the LED output interface 700d may be the output viewed by the user when the user views the ring for output. The LED output interface 700d may include a plurality of LEDs 710d. The LEDs 710d may display any color in any sequence, speed, intensity, a combination thereof, and/or the like. A color displayed on one of the LEDs 710d may move to another in order to notify the user of a status. For example, the color (e.g., red) may move clockwise or counterclockwise on the circumferential surface of the ring (where the LEDs 710d are provided) to indicate a status. The color may also change on a same or different one of the LEDs 710d to show status. For example, a combination of colors may indicate a specific person or event. A combination of at least two color schemes may be implemented to show additional indication or message to the user.

Figure 7E:
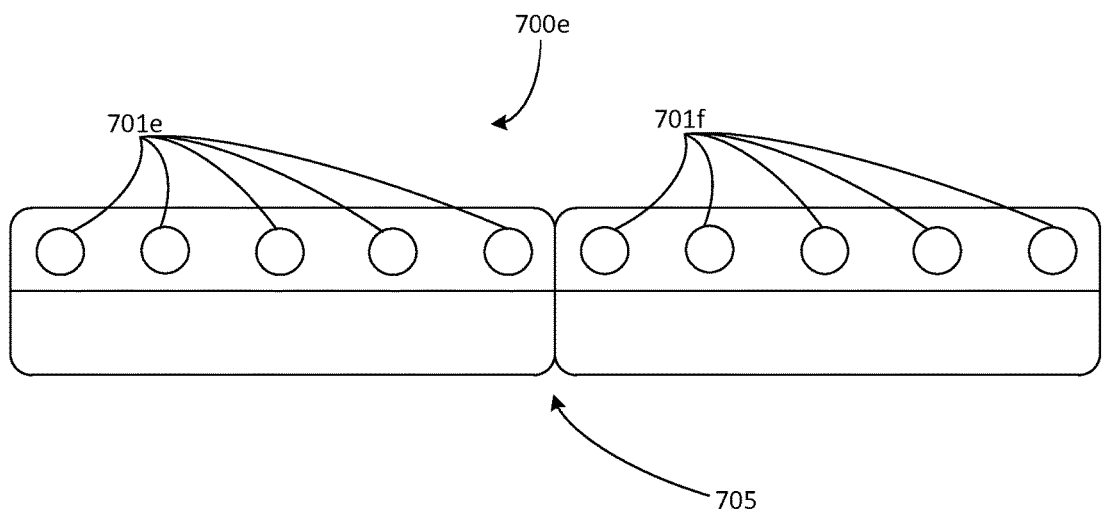
FIG. 7E is a front view of a combination LED display including a first set of LEDs and a second set of LEDs according to various embodiments.

FIG. 7E is a front view of a combination LED display 700e including a first set of LEDs 701e and a second set of LEDs 701f according to various embodiments. Referring to FIGS. 1-7E, each of the first set of LEDs 701e and the second set of LEDs 701f may be a set of LEDs such as, but not limited to, the LEDs 710d. In some embodiments, the combination LED display 700e may be viewed by the user as the two smart rings (e.g., a first smart ring associated with the first set of LEDs 701e and a second smart ring associated with the second set of LEDs 702e) are held together by the fingers of the user (at an edge 705). The fingers may or may not be adjacent fingers on a same hand, as long as they can be brought into contact with one another. The touching of the smart rings may or may not be a precondition to displaying the content. In other embodiments, the two smart rings may not be in contact. The LED lighting patterns may be displayed with both the first set of LEDs 701e and the second set of LEDs 701f. For example, at least some of the first set of LEDs 701e may be lighted up first, then at least some of the second set of LEDs 701 may be lighted up. While two smart rings are illustrated for clarity, one of ordinary skills in the art would appreciate that three or more of smart rings may be used in the same manner for the LED light display. In other words, the lighting patterns may be displayed across a plurality of sets of LEDs of the smart rings to increase the number and pattern of LED lights for outputting various indications.

Various buzzing (i.e., vibration) events may be configured to provide notification to the user of the smart ring 110. For example, the interface 117 may include a vibration generator (e.g., a motor) for generating vibration. Different types of vibration (based on directionality, strength, duration and sequence (as in the multi-ring case)) may denote different indications. For example, the indication may be based on the strength, direction, time, frequency, and/or the like of the vibration. The directionality of the vibration may be simple vibration, rotations, linear movement, and/or the like. In a multi-ring context, the identity of the ring generating the vibration may also be basis for separate input. In other words, vibration event may occur across multiple rings. To illustrate with a non-limiting example, a short, light vibration on a first ring may indicate a SMS text message to the user, while a long heavy vibration on a second ring may indicate an incoming call to the user. Another non-limiting example of the vibration illustrates that a given indication may include vibration on a first ring, then vibration on a second ring subsequently.

Figure 8:
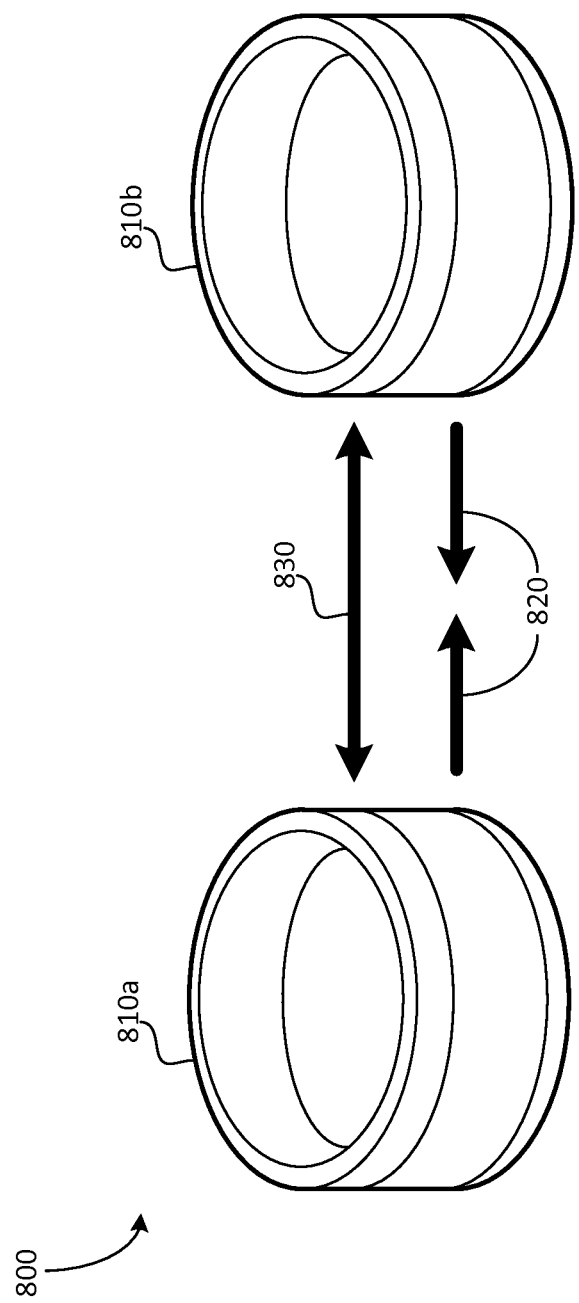
FIG. 8 is a perspective view of a multi-ring magnetic notification system according to various embodiments.

FIG. 8 is a perspective view of a multi-ring magnetic notification system 800 according to various embodiments. Referring to FIGS. 1-8, the multi-ring magnetic notification system 800 may be implemented with the user interface 117 (e.g., the electro-magnetic device 220d) of the smart ring 110 for providing user notification according to various embodiments. For example, each of a first smart ring 810a and second smart ring 810b may include the electro-magnetic device 220d such as a coil for creating an electro-magnetic force. When triggered by a triggering event (which may be receiving a message/call from the primary device or alerting the user), the electro-magnetic device 220d for each of the first smart ring 810a and second smart ring 810b may create attraction 820 or repulsion 830 between the first smart ring 810a and the second smart ring 810b. The reference finger wearing each of the first smart ring 810a and the second smart ring 810b may feel the attraction 820 of the repulsion 830. The strength, frequency, time, a combination thereof, and/or the like of the attraction 820 of the repulsion 830 may each indicate a separate indication to the user.

Various embodiments related to a multi-ring system in which some smart rings (e.g., the smart ring 110) are being operated and worn by the user why other smart rings (e.g., the smart ring 110) are being charged or in a standby/turned-off mode. At least some of the other smart rings may be ready to be used once the smart rings currently in use are at a low power level. For example, at least one smart ring may be in a case or other container (portable or otherwise) ready to be used. When batter power of a currently-used smart ring has been depleted or below a predetermined threshold, one of the at least one smart ring in the case may be used in place of the currently-used smart ring. The currently-used smart ring may be placed in the container, where a charging apparatus may be provided for charging the currently-used smart ring. For example, the user may use two smart rings at a given time and may have additional two smart rings being charged in a case, ready for use. Accordingly, by providing more rings than a user could use at a given time, the multi-ring systems described herein allow smart rings to be used alternately for a long period of time, without the inconvenience of having a bulky battery for each smart ring or the waiting time interval.

In various embodiments, the smart ring 110 may include two portions. A top portion may be a part of the smart ring 110 that is closer to the nail of the finger 102 than a bottom portion when the smart ring 110 is being worn on the finger 102. Given that the smart ring 110 may be worn in any orientation, the top portion and the bottom portion may not always be a same part of the smart ring 110. Therefore, the output (e.g., via the interfaces described herein) of the smart ring 110 may be configured to adjust to the orientation of the smart ring 110. For example, outputting signals (e.g., textual output, lighting LEDs, magnetic attraction/repulsion, and/or the like) in a same sequence and/or direction (irrespective of orientation) may cause the output signals to be flipped when the smart ring 110 is in an orientation opposite to the intended orientation in which the output signals would be outputted appropriately.

In some embodiments, a designated top portion of the smart ring 110 may have different external characteristics (e.g., shape, color, indicia, a combination thereof, and/or the like) than a designated bottom portion. Accordingly, the user of the smart ring 110 may always wear the smart ring 110 in a same orientation (the designated top portion is always the top portion and the designated bottom portion is always the bottom portion) in accordance with the differences regarding the external characteristics to allow appropriate outputting of signals.

In other embodiments, the user interface 117 of the smart ring 110 may include an orientation device (not shown) for orientating the smart ring 110. For example, the orientation device may include an accelerometer configured to detect motion of the smart ring 110. Based on the data from the orientation device, the smart ring 110 (via the processor 111) may determine an appropriate orientation of the smart ring 110, thus outputting signals in an appropriate sequence/direction based on the appropriate orientation. In further embodiments, a gesture described herein may be implemented to signal to the smart ring 110 to ratify output orientation (e.g., flip) output modes of the user interface 117.

Figure 9A:
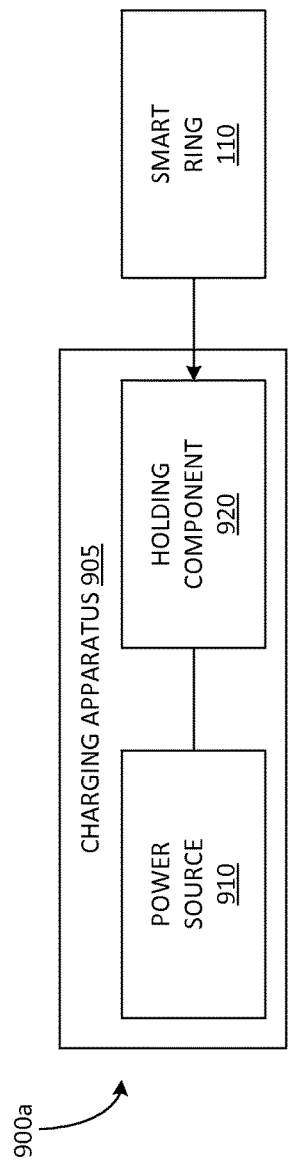
FIG. 9A is schematic diagram of an example of a charging apparatus coupled to a smart ring according to various embodiments.

FIG. 9A is schematic diagram 900a of an example of a charging apparatus 905 coupled to a smart ring 110 according to various embodiments. Referring to FIGS. 1-9A, the charging apparatus 905 may include at least a power source 910 and a holding component 920. The power source 910 may be any suitable battery, capacitor, or other suitable sources of power for charging the smart ring 110. The holding component 920 may be a mechanical and/or electrical components for engaging or otherwise coupling to the smart ring 110 for charging the smart ring 110 and/or holding the smart ring in place. For example, the holding component 920 may include at least a hook, cavity, budge, tab, rib, a combination thereof, and/or the like. The holding component 920 may include electrical connection (for wired power transfer) and/or inductive components (e.g., a coil, for wireless power transfers). The electrical connection of the holding component 920 may be configured to engage a receiving portion of the smart ring 110 for wired charging. The receiving portion may be located on any surfaces of the smart ring 110, including, but not limited to, the outer circumferential surface, inner surface, a upper annular portion, a lower annular portion, a combination thereof, and/or the like. The power source may transfer power to the holding component 920, which, in turn, transfers the power to the smart ring 110 when the smart ring 110 is coupled to the holding component 920.

Figure 9B:
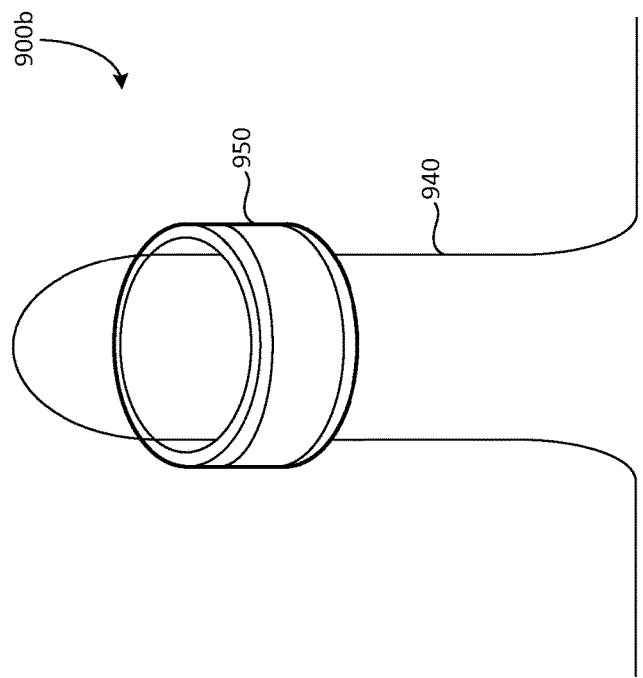
FIG. 9B is perspective view of an example of a charging system according to various embodiments.

FIG. 9B is perspective view of an example of a charging system 900b according to various embodiments. The charging system 900b may include a inductive tab 940, the inductive tab 940 may be, for example, the charging apparatus 905. The inductive tab 940 may include a power source 910 containing the power to be transferred to a smart ring 950. The smart ring 950 may be a device such as, but not limited to, the smart ring 110. A shape of a upper portion (e.g., the holding component 920) of the inductive tab 940 may be configured to hold the smart ring 950 in place when a finger cavity of the smart ring 950 is being occupied by the upper portion. The inductive tab 940 may include a coil for inductively (wirelessly) charging the smart ring 950. In various embodiments, the coil for inductively charging the smart ring 950 in the manner described may be a same coil as the electro-magnetic device 220d. Accordingly, the user may simply hang or hook the smart ring 950 on the inductive tab 940 for charging the inductive tab 940. The inductive tab 940 may be provided in a case or on an article of clothing of the user.

When at least one smart ring 110 is replaced by another smart ring 110, a pairing or association process may be executed by the smart ring 110 and/or the primary device 120, for example, with respect to block B310. In the pairing process, the particular one of a plurality of smart rings 110 may be detected. In other or further embodiments, in the pairing process, a reference finger on which that particular smart ring 110 is being worn may also be detected.

FIG. 10 is an image-based identification process 1000 according to various embodiments. Referring to FIGS. 1-10, the image-based identification process 1000 may be a imaging process executed by a camera and processor 121 of the primary device 120. First at block B1010, the camera of the primary device 120 may capture an image of at least one smart ring 110. In further embodiments, the camera may also capture a reference finger on which each of the at least one smart ring 110 is worn. The image may be a digital image capable of being digitally analyzed.

Next at block B1020, the processor 121 of the primary device 120 may identify at least one smart ring 110 from a plurality of smart rings based on the image. Some of the plurality of smart rings may be currently used (e.g., the at least one smart ring 110) while at least another of the plurality of smart rings may not be used (and not captured by the camera). At least a portion (e.g., an indicia, band, background, rim, and/or the like) of the at least one smart ring 110 may be of a particular color, shape, pattern, and/or the like. The processor 121 may analyze the area of the image associated with the portion of the smart ring 110. By accessing predetermined information stored, for example, on the memory 123, the processor 121 may determine the identity of the at least one smart ring 110 based on stored profiles of the plurality of smart rings.

In addition, the processor 121 may determine an orientation of the smart ring 110 based on the image. A first portion of the smart ring 110 may include various different external characteristics as compared to a second portion of the smart ring 110. The image may show the differences. The processor 121 may determine, based on the imaged differences, whether the first portion or the second portion is the top portion of the smart ring 110. The orientation of the smart ring 110 may accordingly be determined. The smart ring 110 may detect user input and output signals based on the orientation of the smart ring 110 in the manner described.

By illustrating with a non-limiting example, the processor 121, after performing image processing, may recognize that the at least one smart ring 110 is associated with a purple indicia. Stored in the memory 123 are profiles for a first smart ring with a yellow indicia, a second smart ring with a purple indicia, and a third smart ring with a blue indicia. The processor 121 may recognize that the at least one smart ring captured in the image is the second smart ring. The primary device 120 via the processor 121 may then direct the input and output data to the at least one smart ring with settings associated with the second smart ring. In addition, the processor 121 may also identify the reference finger (e.g., the finger 102) on which each of the at least one smart ring is being worn, based on results of the image processing of the image. The input and output data may be adjusted accordingly for the second smart ring being worn on the identified reference finger.

The battery power status and/or consumption characteristics may be displayed on the user interface 117 of the smart ring 110 and/or the user interface 127 of the primary device 120. In various embodiments, a user notification and/or output may be outputted by the smart ring 110 in various manners described to signal to the user that the currently-used smart ring may need to be replaced, and that a pairing process may be executed for the new smart ring.

Figure 11:
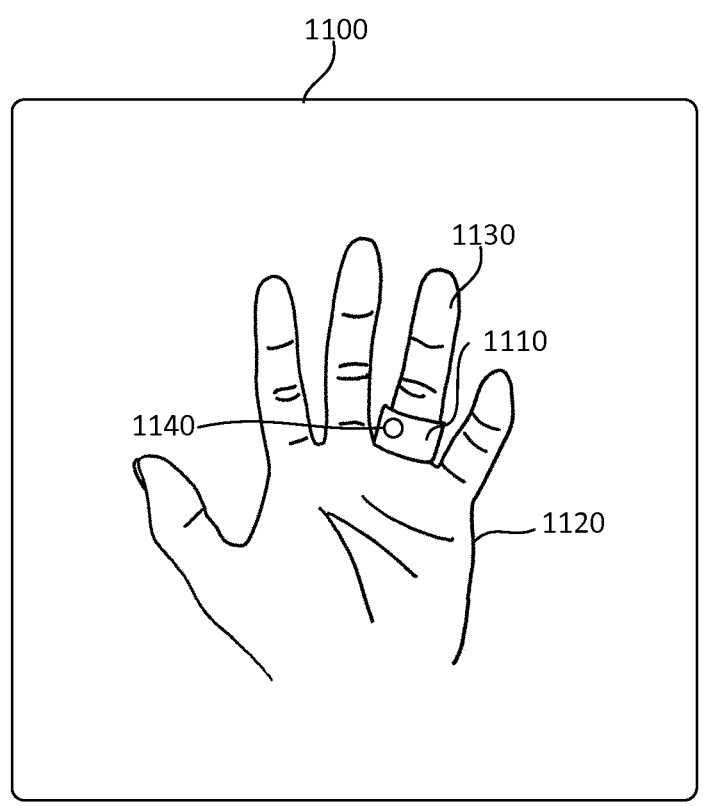
FIG. 11 is a screenshot captured by the camera of the primary device for identifying a smart ring captured in the screenshot from a plurality of smart rings.

FIG. 11 is a screenshot 1100 captured by the camera of the primary device 120 for identifying a smart ring 1110 captured in the screenshot 110 from a plurality of smart rings. Referring to FIGS. 1-11, the screenshot 1100 may be captured at directions of the user of the primary device 120 for the purposes of identifying the smart ring 1110, in the smart ring identification process 1000. The smart ring 1110 may be the smart ring 110 and include, for example, an indicia 1140. The screenshot 1100 may capture a user hand 1120, a reference finger 1130 on the user hand 1120, the smart ring 1110 worn on the reference finger 1130, and the indicia 1140. Based on image processing as described, the identity of the smart ring 1110 may be determined based on the indicia 1140. The reference finger 1130 on which the smart ring 1110 is worn may also be identified.

Alternatively, the user may manually input (via the user interface 127) the identity of the at least one smart ring 1110 and/or the reference finger 1130 associated with the at least one smart ring 110.

Figure 12A:
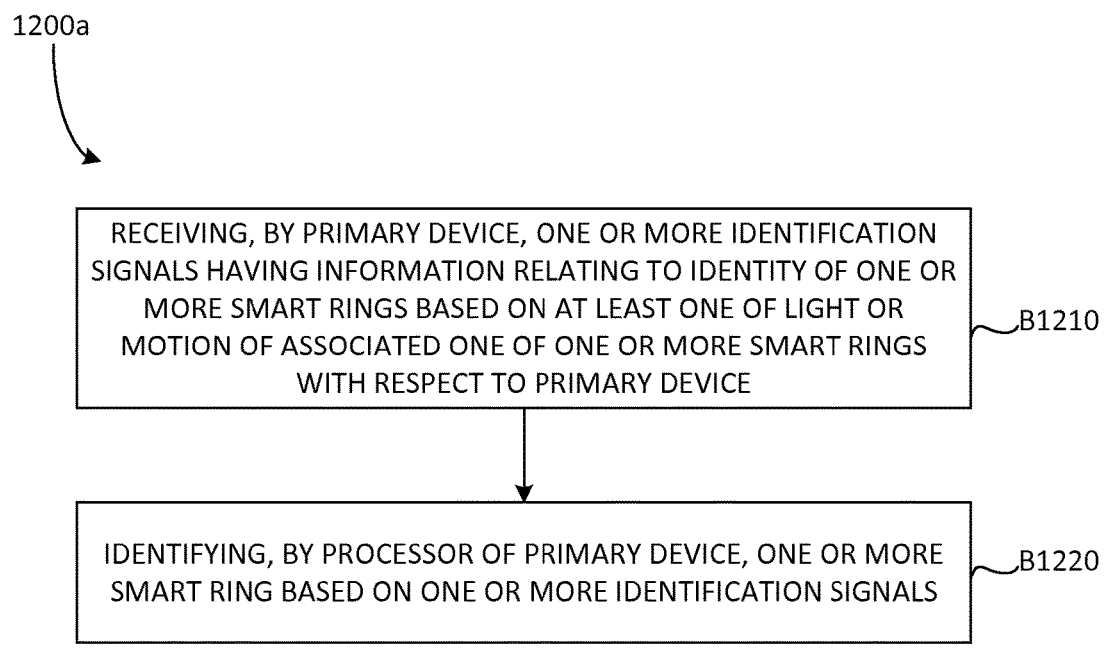
FIG. 12A is a flowchart diagram illustrating an example of a frequency-based identification process according to various embodiments.

FIG. 12A is a frequency-based identification process 1200a according to various embodiments. Referring to FIGS. 1-12A, the frequency-based identification process 1200a may be a light-based, sound-based, or a combination of light-and-sound-based process executed by the user interface 127 and processor 121 of the primary device 120, and/or the user interface 117 and processor 111 of the smart ring 110. First at block B1210, the primary device 120 may receive one or more identification signals having information relating to an identity of one or more smart rings 110, each identification signal may be received from an associated one of the one or more smart rings 110 based on at least one of light or motion of the associated one of the one or more smart rings 110 with respect to the primary device 120. The identification signal may be a sound signal, a light signal (e.g., a reflected light signal), or both. In particular, the microphone of the user interface 127 of the primary device 120 may capture sound emitted by the speaker of the user interface 117 of each of the at least one smart ring 110. In alternative or additional embodiments, a light sensor (of the user interface 127) of the primary device 120 may sense reflected light signals reflected from each of the one or more smart rings 110, the reflected light signals being emitted by a light emitting device of the primary device 120 and reflected from each of the one or more smart rings 110. In embodiments where the at least one smart ring 110 comprises two or more smart rings, each of the two or more smart rings may be emitting a sound or a reflected light with a different frequency.

By way of illustrating with a non-limiting example, different smart rings from the plurality of smart rings 110 may be configured to emit sound signals or light signals of different frequencies. The sound signals may be emitted by a speaker or other sound-generating device of each of the plurality of smart rings 110. In some embodiments, the sound signals generated by each of the smart rings 110 may be a sound in constant frequency and/or constant volume. In other embodiments, the sound signals generated by each of the smart rings 110 may be a sound in varying frequency and/or volume. In one non-limiting example, the sound may be a chirp. In another non-limiting example, the sound generated may be audible or inaudible (e.g., ultrasound).

With respect to light-based implementations, the primary device 120 may capture (with a light sensor or camera of the primary device 120) the light emitted by each of the one or more smart rings 110 or reflected by the one or more smart rings 110. The light reflected by the one or more smart rings may originally emitted by any light source of the primary device 120. The light emitted by the primary device 120 may be reflected by each of the one or more smart rings 110. The light signals generated may be visible or invisible (e.g., infrared). In some embodiments, the light signals may be in constant frequency. In other embodiments, the light signals may be in varying frequency.

The one or more smart rings 110 may be moved with the hand(s) of the user as the one or more smart rings 110 is being worn on at least one finger of the user. The user may perform a swiping motion, swiping the hand(s) (along with the one or more smart rings 110) across a space proximal to (for example, the microphone of) the primary device 120. The motion of the one or more smart rings 110 may be implemented for both sound signals and light signals described herein. Implementations of the light signals may include the one or more smart rings 110 being static (as well as in motion) with respect to the one or more smart rings 110.

With respect to sound signal implementations, when the one or more smart rings 110 are being moved across a space (from an initial position to a final position) proximal to the microphone of the primary device 120, the microphone of the primary device 120 may detect a shift in frequency (e.g., Doppler shift). Each of the initial and final positions may be associated with a different distance with respect to the microphone of the primary device 120. When two or more smart rings 110 are being moved across the space, the Doppler shift with respect to each of the two or more smart rings 110 may be captured by the microphone of the primary device 120 simultaneously. Each of the one or more smart rings 110 may include one or more microphones/speakers.

Next at block B1220, the processor 121 of the primary device 120 may identify the one or more smart rings 110 based on the one or more identification signals. In some embodiments, identifying the smart ring may include selecting a profile associated with the one or more smart rings 110 from a plurality of profiles associated with the plurality of smart rings available, as stored in the memory 123 of the primary device 120. For example, the profiles of the plurality of smart rings may include Doppler shift profiles. The number of the plurality of smart rings available may be greater than or equal to the number of the one or more smart rings 110. The Doppler shift profile captured by the microphone or light sensor of the primary device 120 may be compared with the plurality of profiles, and the closest of the plurality of profiles may be selected.

Accordingly, the identity of the one or more smart rings 110 may be determined, based on the identification signal. Whereas two or more smart rings are worn, Doppler shift profiles associated with each of the two or more smart rings may be used to approximate the relative distance between the two or more smart rings. Therefore, relative distance between two reference fingers on which the two or more smart rings are worn may be determined based on the Doppler shift profiles associated with each of the two or more smart rings.

In addition, based on the relative distances between the reference fingers, the identity of the reference fingers may be determined. For example, a sequential order in which the two or more smart rings pass over a given position of the primary device 120 (e.g., a microphone) may be determined based on the Doppler shift associated with each of the two or more rings. In a non-limiting example, the user is to (based on usage instructions) wear four smart rings on each of the four fingers of the right hand. When the user swipes the right hand from right to left while each of the four smart rings may be emitting a sound of different frequency, the primary device 120 (via the processor 121) may determine an order in which each of the four smart rings passes the given position with respect to the primary device 120 (e.g., the given point may be the microphone or any other arbitrary point) from right to left. Accordingly, the processor 121 may determine that the first smart ring to pass the given point from right to left may be worn on the index finger of the right hand of the user, the second smart ring to pass the given position from right to let may be worn on the middle finger of the right hand of the user, and the like.

Figure 12B:
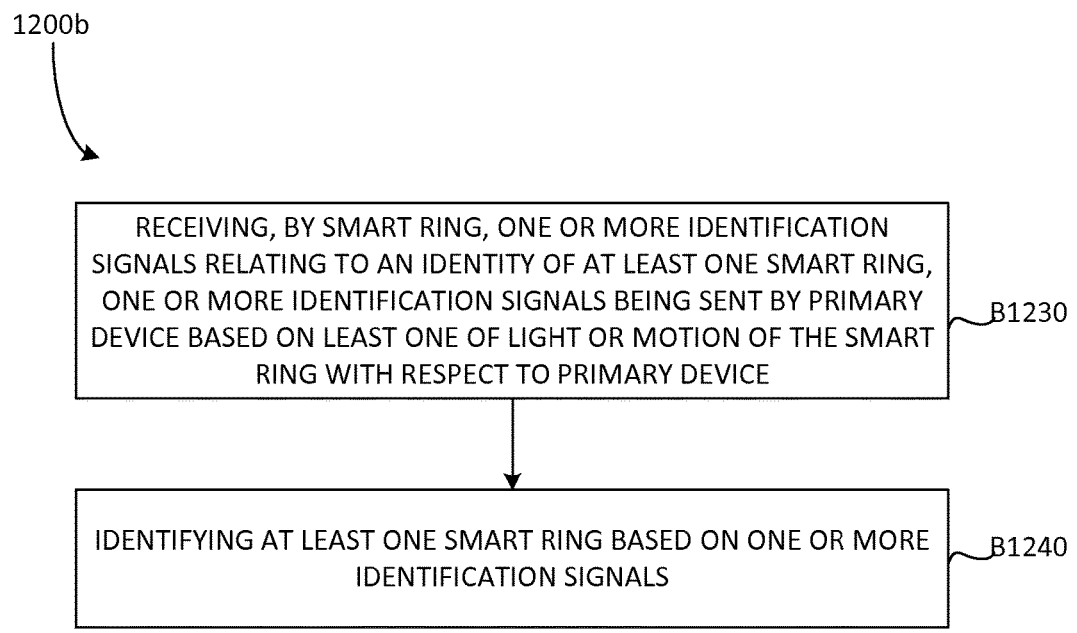
FIG. 12B is a flowchart diagram illustrating an example of a frequency-based identification process according to various embodiments.

Alternatively, instead of the smart ring 110 emitting sound signals while the primary device 120 receiving the sound signals, the primary device 120 may emit a sound signal associated with a frequency, and the smart ring 110 may receive the sound signal. Similar, instead of the primary device 120 emitting the reflected light signals and receiving reflected light signals reflected from the one or more smart rings 110, the one or more smart rings 110 may emitting the light signals and receive reflected light signals reflected from the primary device 120. FIG. 12B is a flowchart diagram illustrating an example of a frequency-based identification process 1200b according to various embodiments.

Referring to FIGS. 1-12B, the frequency-based identification process 1200b may be a light and/or sound-based process executed by the user interface 127 and processor 121 of the primary device 120, and/or the user interface 117 and processor 111 of the smart ring 110. First at block B1230, the at least one smart ring 110 may receive one or more identification signals relating to an identity of the at least one smart ring 110, the one or more identification signals may be sent by the primary device 120 based on at least one of light or motion of the at least one smart ring 110 with respect to the primary device 120.

With respect to sound signals, as the user moves the smart ring 110 (being worn on a reference finger or otherwise) and/or the primary device 120 with respect to each other, the smart ring 110 may capture the Doppler shift of the sound signal sent by the primary device 120 with a microphone. With respect to light, the identification signal may include a reflected light signals reflected from the primary device 120. The reflected light signals may be light signals emitted by the smart ring 110 and reflected by the primary device 120. The at least one smart ring 120 may sense the reflected light signals with a light sensor. In the multi-ring scenario, different smart rings 110 may be at different locations at a given time. Therefore, when the primary device 120 may emit a same sound with a same frequency while the Doppler shift detected by each of the two or more smart rings 110 may be different.

Next at block B1240, the at least one smart ring 110 or the primary device 120 may identify the at least one smart ring 110 based on the one or more identification signals. After capturing the Doppler shift profiles associated with the two or more smart rings 110, the Doppler shift profiles may be transmitted, via the network, to each of the two or more smart rings 110 and/or the primary device 120 for analysis. For example, in the multi-ring context, based on the different Doppler shift profiles, one or more of the two or more smart rings 110 (with the processor 111) and/or the primary device 120 (with the processor 121) may determine, the relative positions of the two or more smart rings 110. Based on the relative positions, the fingers on which the at least one smart rings 110 are worn may be determined in the manner described.

Figure 13A:
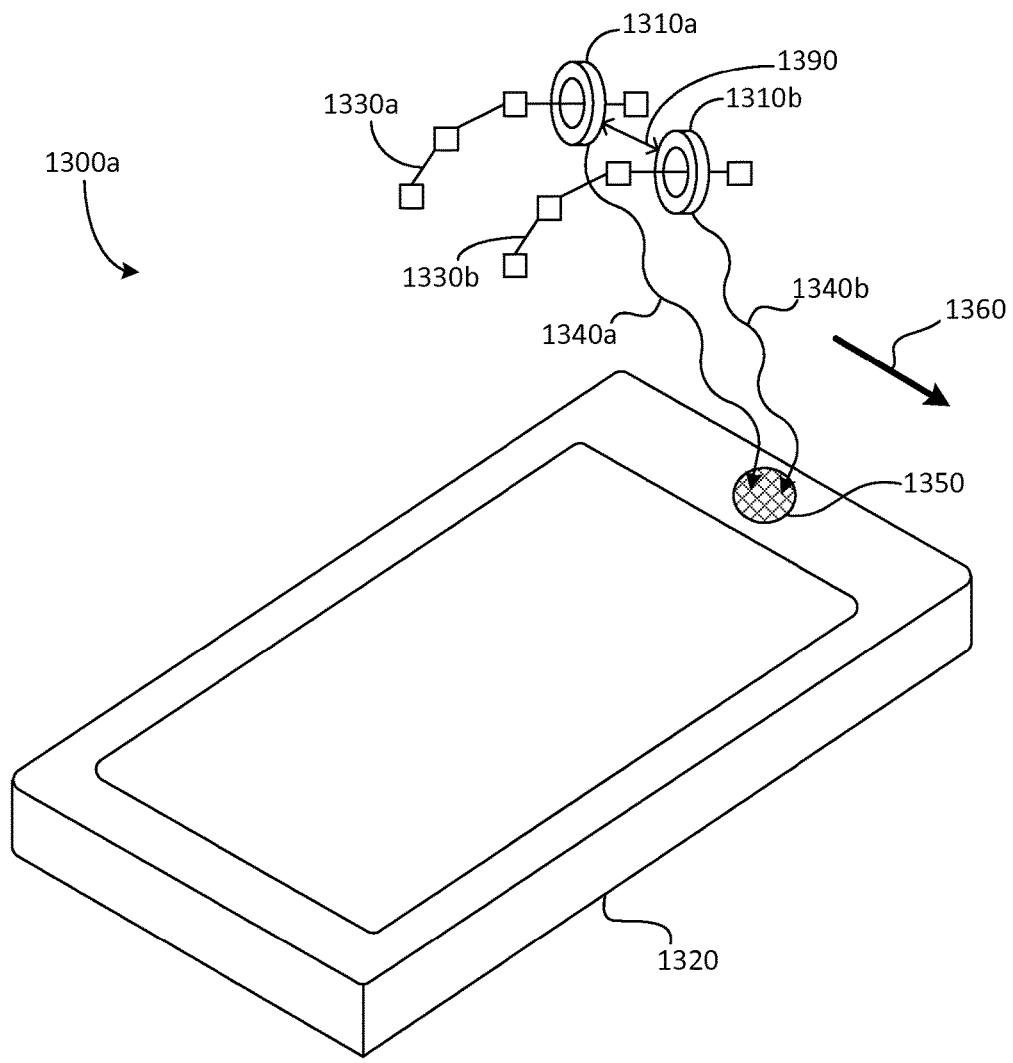
FIG. 13A is a schematic diagram illustrating an example of two smart rings being in initial positions during the frequency-based identification process according to various embodiments.
Figure 13B:
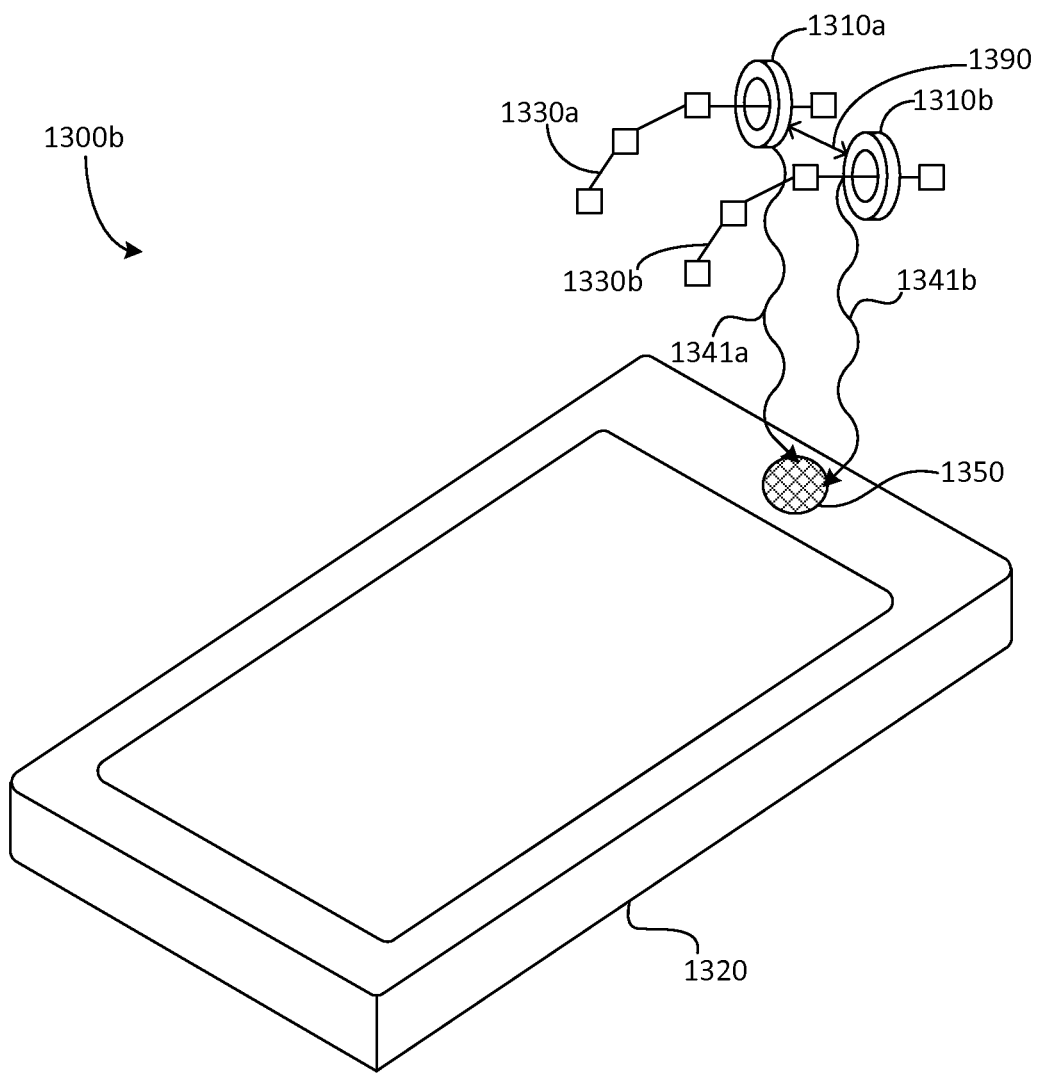
FIG. 13B is a schematic diagram illustrating an example of the two smart rings being in final positions during the frequency-based identification process according to various embodiments.

FIG. 13A is a schematic diagram 1300a illustrating an example of two smart rings 1310a, 1301b being in initial positions during the frequency-based identification process 1200 according to various embodiments. FIG. 13B is a schematic diagram 1300b illustrating an example of the two smart rings 1310a, 1301b being in final positions during the frequency-based identification process 1200 according to various embodiments.

Referring to FIGS. 1-13B, the first smart ring 1310a may be worn on a first reference finger 1330a, and the second smart ring 1310b may be worn on a second reference finger 1330b. In their initial positions, the first smart ring 1310a may be emitting a first sound with a first initial sound wave 1340a with respect to a microphone 1350 (e.g., the microphone of the user interface 127) of the primary device 1320 (e.g., the primary device 120) while the second smart ring 1310b may be emitting a second sound with a second initial sound wave 1340b with respect to a microphone 1350. The hand of the user having the first reference finger 1330a and the second reference finger 1330b may be moving in a direction 1360.

In their final positions, the first smart ring 1310a may be emitting the first sound with a first final sound wave 1341a with respect to a microphone 1350 while the second smart ring 1310b may be emitting the second sound with a second final sound wave 1341b with respect to a microphone 1350. Due to Doppler shift, the microphone 1350 may capture the first initial sound wave 1340a and the first final sound wave 1341a with different frequencies. Similarly, the microphone 1350 may capture the second initial sound wave 1340b and the second final sound wave 1341a with different frequencies. Based on the Doppler shift detected and the Doppler shift associated with each of the plurality of total available smart rings, the identity of the first smart ring 1310a and the second smart ring 1310b may be determined in the manner described. In addition, the distance 1390 between the first smart ring 1310a and the second smart ring 1310b may be determined based on the Doppler shift detected by the microphone 1350. A positive Doppler shift (which occurs when a smart ring is moving toward the microphone 1350) and a negative Doppler shift (which occurs when a smart ring is moving away from the microphone 1350) may be distinguished.

While various embodiments herein relate to sound, one of ordinary skill in the art would appreciate that similar concept is applicable to light, given that light may also be associated with a given frequency.

Figure 14:
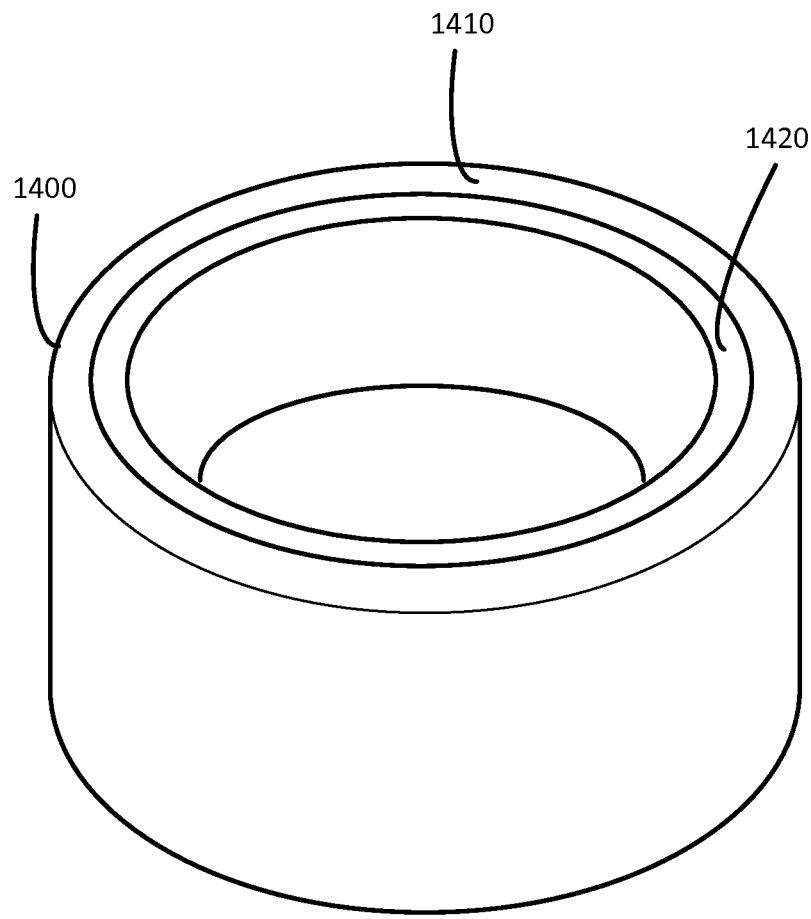
FIG. 14 is a perspective view of a smart ring according to various embodiments.

FIG. 14 is a perspective view of a smart ring 1400 according to various embodiments. Referring to FIGS. 1-14, the smart ring 1400 may be a smart ring such as, but not limited to, the smart ring 110. The smart ring 1400 may be modular in nature and may be separated into two components. A customizable component 1420 may be configured for varying finger sizes. For example, the customizable component 1420 may be a portion of the structural element 119 that does not include any electronics. The customizable component 1420 may be an annular ring (e.g., an inner annular ring of the smart ring 1400, a separate crown, and/or the like) of varying sizes based on the user finger size. The customizable component 1420 may be detachable from the rest of the smart ring 1400.

A main component 1410 may provide structure for various electronics and may be the same for all smart rings 1400 regardless of finger size. For example, the main component 1410 may be an outer annular ring provided with at least one of a set of light pipes, conductive pipes, LCD/LED, Pixtronix, other types of the user interface 117, the processor 111, the memory 113, the network device 115, a portion of the structural element 119, and/or the like. The customizable component 1420 and the main component 1410 may be detached from each other. One of the customizable component 1420 and the main component 1410 (e.g., the main component 1410) may include the power source of the smart ring 1400. Once detached, the component having the power source may be charged with suitable charging devices, such as, but not limited to, the charging apparatus 905, the charging system 900b, and/or the like. Alternatively, once the customizable component 1420 and the main component 1410 are connected to one another, the customizable component 1420 and the main component 1410 cannot be separated. The main component 1410 and the customizable component 1420 may be concentric.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Various modifications to embodiments described herein will be readily apparent to those skilled in the art, and the generic principles defined herein may be applied to some embodiments without departing from the spirit or scope of the disclosure. Thus, the present disclosure is not intended to be limited to the embodiments shown herein but is to be accorded the widest scope consistent with the following claims and the principles and novel features described herein.

What is claimed is:

1. A method, comprising:
receiving, by a primary device, identification signals from one or more smart rings, the identification signals comprising a sound signal generated by the one or more smart rings, each sound signal including a Doppler shift associated with a motion of the one or more smart rings with respect to the primary device; and
identifying, by the primary device, the one or more smart rings based on identifying the Doppler shift of the identification signal associated with the one or more smart rings.

2. The method of claim 1, wherein the identification signals further comprise light signals from the group consisting of light emitted by the one or more smart rings and light reflected by the one or more smart rings.

3. The method of claim 1, further comprising:
storing a plurality of identification signals associated with a plurality of the smart rings, wherein identifying the one or more smart rings comprises comparing the received identification signals with the plurality of stored identification signals.

4. The method of claim 1, wherein
receiving the identification signals comprises:
receiving a first identification signal associated with a first smart ring; and
receiving a second identification signal associated with a second smart ring.

5. The method of claim 4, wherein:
the first identification signal is a first sound signal having a first frequency, the first sound signal generated by the first smart ring in motion with respect to the primary device; and
the second identification signal is a second sound signal having a second frequency, the second sound signal generated by the second smart ring in motion with respect to the primary device, wherein
the first frequency and the second frequency are different.

6. The method of claim 5, wherein identifying the one or more smart rings based on the Doppler shift of the identification signals comprises:
identifying a first Doppler shift associated with the first frequency; and
identifying a second Doppler shift associated with the second frequency.

7. The method of claim 6, wherein the first Doppler shift and the second Doppler shift are captured by a microphone of the primary device.

8. The method of claim 7, wherein receiving the identification signals comprises:
receiving the identification signals as the first and the second smart rings are moved in a predefined first direction.

9. The method of claim 4, wherein identifying the one or more smart rings comprises:
identifying a relative position between the first smart ring and the second smart ring as the first smart ring and the second smart ring are moved with respect to the primary device in a predefined first direction.

10. The method of claim 4, wherein identifying the one or more smart rings comprises:
identifying a first finger on which the first smart ring is worn; and
identifying a second finger on which the second smart ring is worn.

11. The method of claim 4, wherein identifying the one or more smart rings comprises:
determining a sequential order in which the first smart ring and the second smart ring pass a predefined area associated with the primary device.

12. The method of claim 4, wherein identifying the one or more smart rings comprises:
identifying the first smart ring and the second smart ring from a plurality of three or more smart rings.

13. The method of claim 4, wherein identifying the one or more smart rings comprises:
identifying a spatial relationship between the first smart ring and the second smart ring.

14. A method, comprising,
receiving, by a smart ring, identification signals from a speaker of a primary device, the identification signals comprising a sound signal including a Doppler shift caused by motion of the smart ring with respect to the primary device; and
identifying the smart ring based on identifying the Doppler shift associated with of the identification signals.

15. The method of claim 14, wherein the identification signals further comprise a reflected light signal.

16. The method of claim 14, further comprising:
storing a plurality of identification signals associated with a plurality of smart rings, wherein identifying the smart ring comprises comparing the received identification signals with the plurality of stored identification signals.

17. The method of claim 14 further comprising:
emitting, by the smart ring, light to the primary device;
capturing light reflected by the primary device; and
identifying the smart ring based on the light associated with the smart ring.

18. A system, comprising:
one or more smart rings, the one or more smart rings comprising a speaker to generate sound signals; and
a primary device comprising:
an interface configured to receive identification signals from the one or more smart rings, wherein each identification signal comprises a sound signal including a frequency and a Doppler shift associated with a motion of the one or more smart rings with respect to the primary device; and
a processor configured to identify the one or more smart rings based on identifying the Doppler shift associated with the identification signals.

19. The system of claim 18, wherein:
the processor is configured to store a plurality of stored identification signals associated with each of a plurality of the smart rings; and
the processor is configured to identify the one or more smart rings by comparing the received identification signals with the plurality of stored identification signals.

20. The system of claim 18, wherein the interface is further configured to:
receive a first identification signal associated with a first smart ring; and
receive a second identification signal associated with a second smart ring.

21. The system of claim 20, wherein:
the first identification signal is a first sound signal having a first frequency, the first sound signal generated by the first smart ring in motion with respect to the primary device; and
the second identification signal is a second sound signal having a second frequency, the second sound signal generated by the second smart ring while in motion with respect to the primary device, wherein
the first frequency and the second frequency are different.

22. The system of claim 21, wherein the processor is further configured to:
identify a first Doppler shift associated with the first frequency; and
identify a second Doppler shift associated with the second frequency.

23. The system of claim 22, wherein the interface is further configured to:
receive the first and the second identification signals as the first and the second smart rings are moved in a predefined first direction.

24. The system of claim 20, wherein the processor is configured to:
identify the one or more smart rings by identifying a relative position between the first smart ring and the second smart ring as the first and the second smart rings are moved with respect to the primary device in a predefined first direction.

25. The system of claim 20, wherein the processor is further configured to:
identify a first finger on which the first smart ring is worn; and
identify a second finger on which the second smart ring is worn.

26. The system of claim 20, wherein the processor is further configured to:

identify the one or more smart rings by determining a sequential order in which the first smart ring and the second smart ring pass a predefined area associated with the primary device.

27. A system, comprising:

means for receiving identification signals from one or more smart rings, the identification signals comprising a sound signal generated by the one or more smart rings, each sound signal including a Doppler shift caused by motion of the one or more smart ring with respect to a primary device; and means for identifying the one or more smart rings based on identifying the Doppler shift of the identification signals associated with the one or more smart rings.

* * * * *